United States Patent
Lee et al.

(10) Patent No.: US 11,834,528 B2
(45) Date of Patent: Dec. 5, 2023

(54) POLYETHYLENE AND CHLORINATED POLYETHYLENE THEREOF

(71) Applicant: LG Chem, Ltd., Seoul (KR)

(72) Inventors: Si Jung Lee, Daejeon (KR); Bog Ki Hong, Daejeon (KR); Sunghyun Park, Daejeon (KR); Sun Mi Kim, Daejeon (KR); Yi Young Choi, Daejeon (KR); Cheolhwan Jeong, Daejeon (KR); Jinseok Lee, Daejeon (KR)

(73) Assignee: LG Chem, Ltd.

( * ) Notice: Subject to any disclaimer, the term of this patent is extended or adjusted under 35 U.S.C. 154(b) by 611 days.

(21) Appl. No.: 17/051,983

(22) PCT Filed: Dec. 10, 2019

(86) PCT No.: PCT/KR2019/017400
§ 371 (c)(1),
(2) Date: Oct. 30, 2020

(87) PCT Pub. No.: WO2020/122563
PCT Pub. Date: Jun. 18, 2020

(65) Prior Publication Data
US 2021/0230322 A1 Jul. 29, 2021

(30) Foreign Application Priority Data

Dec. 10, 2018 (KR) .......................... 10-2018-0158329
Dec. 9, 2019 (KR) .......................... 10-2019-0163114

(51) Int. Cl.
*C08F 110/02* (2006.01)
*C08F 8/22* (2006.01)

(52) U.S. Cl.
CPC .............. *C08F 110/02* (2013.01); *C08F 8/22* (2013.01); *C08F 2500/12* (2013.01); *C08F 2500/18* (2013.01); *C08F 2810/20* (2013.01)

(58) Field of Classification Search
None
See application file for complete search history.

(56) References Cited

U.S. PATENT DOCUMENTS

| | | | |
|---|---|---|---|
| 5,914,289 A | 6/1999 | Razavi | |
| 2009/0062488 A1* | 3/2009 | Nagy | C08F 210/16 526/172 |
| 2015/0344595 A1* | 12/2015 | Castro | C08F 10/06 526/127 |
| 2015/0361315 A1* | 12/2015 | Karjala | C09J 151/06 525/71 |
| 2016/0229931 A1 | 8/2016 | Yoo et al. | |
| 2017/0233511 A1 | 8/2017 | Sun et al. | |
| 2019/0086308 A1 | 3/2019 | Lee et al. | |
| 2019/0169323 A1 | 6/2019 | Lee et al. | |
| 2019/0276572 A1* | 9/2019 | Hagadorn | C08F 2/001 |
| 2020/0223964 A1* | 7/2020 | Park | G01N 3/56 |
| 2021/0080367 A1* | 3/2021 | Lee | G01N 25/04 |

FOREIGN PATENT DOCUMENTS

| | | |
|---|---|---|
| EP | 3372620 A1 | 9/2018 |
| KR | 20040076965 A | 9/2004 |
| KR | 20090088620 A | 8/2009 |
| KR | 20140125727 A | 10/2014 |
| KR | 20150058938 A | 5/2015 |
| KR | 101603407 B1 | 3/2016 |
| KR | 20160123123 A | 10/2016 |
| KR | 20170030924 A | 3/2017 |
| KR | 101723774 B1 | 4/2017 |
| KR | 20180043680 A | 4/2018 |
| KR | 20180058574 A | 6/2018 |
| WO | 9950316 A1 | 10/1999 |
| WO | 2004076502 A1 | 9/2004 |
| WO | 2021060907 A1 | 4/2021 |

OTHER PUBLICATIONS

Alexakis A, Gardette M, Colin S. Mild protection and deprotection of alcohols as ter-butyl ethers in the field of pheromone synthesis. Tetrahedron letters. Jan. 1, 1988;29(24):2951-4.
International Search Report for PCT/KR2019/017400 dated Apr. 3, 2020; 3 pages.
Extended European Search Report for Application No. 19895368.9, dated Jul. 12, 2021, 9 pages.

* cited by examiner

*Primary Examiner* — Robert S Loewe

(74) *Attorney, Agent, or Firm* — Lerner David LLP

(57) ABSTRACT

The polyethylene according to the present disclosure reacts with chlorine to prepare a chlorinated polyethylene having excellent processability during extrusion with a high tensile strength by implementing a molecular structure having a high content of medium molecular weight, and may also prepare a CPE compound including the chlorinated polyethylene.

20 Claims, No Drawings

POLYETHYLENE AND CHLORINATED POLYETHYLENE THEREOF

CROSS-REFERENCE TO RELATED APPLICATION(S)

This application is a national phase entry under 35 U.S.C. § 371 of International Application No. PCT/KR2019/017400 filed Dec. 10, 2019, which claims priority from Korean Patent Application No. 10-2018-0158329 filed Dec. 10, 2018, and Korean Patent Application No. 10-2019-0163114 filed Dec. 9, 2019, all of which are incorporated herein by reference.

TECHNICAL FIELD

The present disclosure relates to a polyethylene which can prepare a chlorinated polyethylene having excellent processability during extrusion while improving tensile strength by implementing a molecular structure having a high content of medium molecular weight, and a chlorinated polyethylene thereof.

BACKGROUND

Olefin polymerization catalyst systems may be divided into Ziegler-Natta and metallocene catalysts, and these highly active catalyst systems have been developed in accordance with their characteristics. Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties.

Meanwhile, the metallocene catalyst includes a main catalyst having a transition metal compound as a main component and an organometallic compound cocatalyst having aluminum as a main component. Such a catalyst is a single-site catalyst which is a homogeneous complex catalyst, and offers a polymer having a narrow molecular weight distribution and a uniform compositional distribution of comonomers, due to the single site characteristics. The stereoregularity, copolymerization characteristics, molecular weight, crystallinity, etc. of the resulting polymer may be controlled by changing a ligand structure of the catalyst and polymerization conditions.

U.S. Pat. No. 5,914,289 discloses a method for controlling a molecular weight and a molecular weight distribution of polymers using metallocene catalysts which are respectively supported on supports. However, a large amount of solvent and a long period of time are required to prepare the supported catalysts, and a process of supporting metallocene catalysts on the respective supports is troublesome.

Korean Patent Application No. 2003-12308 discloses a method for controlling molecular weight distributions of polymers, in which the polymerization is performed while changing a combination of catalysts in a reactor by supporting a dinuclear metallocene catalyst and a mononuclear metallocene catalyst on a support together with an activating agent. However, this method has limitations in simultaneously realizing the characteristics of respective catalysts. In addition, there is a disadvantage that the metallocene catalysts are departed from a supported component of the resulting catalyst to cause fouling in the reactor.

Therefore, to solve the above drawbacks, there is a continuous demand for a method for preparing polyolefins with desired physical properties by easily preparing a supported metallocene catalyst having an excellent activity.

Meanwhile, chlorinated polyethylenes prepared by reacting polyethylenes with chlorine are known to have better physical and mechanical properties than the polyethylene, and in particular, they can resist harsh external environments, and thus, can be used as a packing material such as various containers, fibers and pipes and a heat transfer material.

Chlorinated polyethylenes are generally prepared by making the polyethylene in suspension and then reacting with chlorine, or by placing the polyethylene in an aqueous HCl solution and then reacting with chlorine to replace hydrogen of the polyethylene with chlorine.

In order to fully express properties of the chlorinated polyethylene, the chlorine must be uniformly substituted in the polyethylene, which is affected by the properties of the polyethylene reacting with chlorine. In particular, chlorinated polyethylenes (CPE) are widely used for wires and cables by compounding with inorganic additives and cross-linking agents, and are generally prepared by reacting polyethylene with chlorine in a suspension, or by reacting polyethylene with chlorine in aqueous HCl solution. This CPE compound product requires excellent tensile strength, and the strength of the compound varies depending on physical properties of the chlorinated polyethylene. In the case of general-purpose chlorinated polyethylenes which are widely known at present, since a polyethylene prepared using Ziegler-Natta catalyst is applied, the uniformity in chlorine distribution is decreased in the polyethylene due to the broad molecular weight distribution. There is also a disadvantage in that the tensile strength is insufficient when preparing the CPE compound.

Accordingly, excellent uniformity in chlorine distribution is required in the chlorinated polyethylene in order to improve tensile strength and processability during extrusion. Thus, there is a continuous demand for developing a method for preparing a polyethylene having a molecular structure with a high content of medium molecular weight.

DETAILED DESCRIPTION OF THE INVENTION

Technical Problem

The present disclosure is to provide a polyethylene which can prepare a chlorinated polyethylene having excellent processability during extrusion while improving tensile strength due to a narrow molecular weight distribution by implementing a molecular structure having a high content of medium molecular weight, and a chlorinated polyethylene thereof.

In addition, the present disclosure is to provide a method for preparing the polyethylene.

Technical Solution

According to one embodiment of the present disclosure, a polyethylene having an entanglement molecular weight (Me) of 9500 g/mol to 13000 g/mol, a melt flow rate ratio (MFRR$_{21.6/5}$, a value obtained by dividing the melt index measured at 190° C. under a load of 21.6 kg by the melt index measured at 190° C. under a load of 5 kg in accordance with ASTM D 1238) of 16 to 25, and a molecular weight distribution (MWD, Mw/Mn) of 5.5 to 10 is provided.

In addition, the present disclosure provides a method for preparing the polyethylene.

The present disclosure also provides a chlorinated polyethylene prepared by reacting the polyethylene with chlorine.

Advantageous Effects

A polyethylene according to the present disclosure is reacted with chlorine to prepare a chlorinated polyethylene excellent in chlorination productivity and thermal stability by implementing a molecular structure having a high content of medium molecular weight.

DETAILED DESCRIPTION OF THE EMBODIMENTS

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, numbers, steps, components, or combinations thereof, but do not preclude the presence or addition of one or more other features, numbers, steps, components, or combinations thereof.

The terminology "about" or "substantially" is intended to have meanings close to numerical values or ranges specified with an allowable error and intended to prevent accurate or absolute numerical values disclosed for understanding of the present invention from being illegally or unfairly used by any unconscionable third party.

For reference, "parts by weight" as used herein refers to a relative concept of a ratio of the weight of the material based on the weight of a specific material. For example, in a mixture containing 50 g of material A, 20 g of material B, and 30 g of material C, the amounts of material B and C based on 100 parts by weight of material A are 40 parts by weight and 60 parts by weight, respectively.

In addition, "wt % (% by weight)" refers to an absolute concept of expressing the weight of a specific material in percentage based on the total weight. In the above-described mixture, the contents of material A, B and C based on 100% of the total weight of the mixture are 50%, 20% and 30% by weight, respectively. At this time, a sum of contents of each component does not exceed 100 weight %.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present disclosure will be described in more detail.

According to one embodiment of the present disclosure, there is provided a polyethylene which can prepare a chlorinated polyethylene having excellent processability during extrusion while improving tensile strength by implementing a molecular structure having a high content of medium molecular weight.

The polyethylene is characterized in that an entanglement molecular weight (Me) is 9500 g/mol to 13000 g/mol, a melt flow rate ratio (MFRR$_{21.6/5}$, a value obtained by dividing the melt index measured at 190° C. under a load of 21.6 kg by the melt index measured at 190° C. under a load of 5 kg in accordance with ASTM D 1238) is 16 to 25, and a molecular weight distribution (MWD, Mw/Mn) is 5.5 to 10.

In general, chlorinated polyethylenes are produced by reacting polyethylenes with chlorine, which means that a part of hydrogen of the polyethylene is substituted with chlorine. When hydrogen of the polyethylene is substituted with chlorine, properties of the polyethylene are changed because atomic volumes of hydrogen and chlorine are different. For example, chlorination productivity and thermal stability are further increased. In particular, the smaller and uniform the overall size of the chlorinated polyethylene particles, the more easily the chlorine penetrates to the center of the polyethylene particles, so that the degree of chlorine substitution in the particles can be uniform, thereby exhibiting excellent physical properties. To this end, the polyethylene according to the present disclosure may provide a chlorinated polyethylene having a high content of medium molecular weight in the molecular structure, thereby exhibiting excellent tensile strength and excellent processability during extrusion.

The polyethylene of the present disclosure is characterized by a high content of medium molecular weight in the molecular structure, thereby having an excellent entanglement molecular weight (Me) and a high degree of cross-linking with a narrow molecular weight distribution. As a result, it is possible to prepare a chlorinated polyethylene excellent in chlorination productivity, thermal stability and mechanical properties while the elongational viscosity for cross-linked polyethylene (210° C., 0.5 s) is increased.

The polyethylene according to the present disclosure may be an ethylene homopolymer which does not contain a separate copolymer.

The polyethylene may have a low entanglement molecular weight (Me) of about 9500 g/mol to about 13000 g/mol. Specifically, the entanglement molecular weight (Me) may be about 9600 g/mol to about 12800 g/mol, or about 9800 g/mol to about 12600 g/mol. The entanglement molecular weight (Me) should be about 9500 g/mol or more in terms of processability during extrusion, and about 13000 g/mol or less in terms of ensuring excellent mechanical properties and sufficient strength when processing molded products.

Herein, the entanglement molecular weight (Me) of the polyethylene refers to an average molecular weight of entanglement points when one polymer chain is entangled with a surrounding polymer or itself to form an entanglement point functioning as a physical crosslink. The higher the molecular weight of the polymer, the longer the length of the polymer chain, which increases a probability of generating the entanglement point and reduces the entanglement molecular weight. As the entanglement molecular weight is smaller, the degree of entanglement of the polymer is increased, which means that the resistance to external force is increased.

The entanglement molecular weight (Me) may be calculated by using a plateau modulus ($G_N^0$) obtained from a storage modulus and a loss modulus of the polyethylene measured at a temperature of 150° C. to 230° C. at an angular frequency of 0.05 rad/s to 500 rad/s at 0.5% strain with a rotational rheometer. Specifically, the plateau modulus ($G_N^0$) is a storage modulus when the loss modulus has a minimum value in a region where the storage modulus is greater than the loss modulus. A method for measuring the entanglement molecular weight of the polyethylene is as described in Test Example 1 to be described later, and the detailed description is omitted.

In particular, the polyethylene is prepared by optimizing a specific metallocene catalyst as described below, thereby optimizing a melt flow rate ratio (MFRR$_{21.6/5}$, a value obtained by dividing the melt index measured at 190° C.

under a load of 21.6 kg by the melt index measured at 190° C. under a load of 5 kg in accordance with ASTM D 1238), and a molecular weight distribution (MWD, Mw/Mn) together with the entanglement molecular weight (Me). Thus, the polyethylene has a high content of medium molecular weight in the molecular structure and may improve tensile strength of CPE compound.

The polyethylene has a melt flow rate ratio (MFRR$_{21.6/5}$, a value obtained by dividing the melt index measured at 190° C. under a load of 21.6 kg by the melt index measured at 190° C. under a load of 5 kg in accordance with ASTM D 1238) of about 16 to about 25. Specifically, the melt flow rate ratio may be about 17 to about 23 or about 18 to about 22. The melt flow rate ratio should be about 16 or more in terms of processability during extrusion, and about 25 or less in terms of securing excellent mechanical properties by increasing MV (Mooney viscosity) of CPE.

The melt flow rate ratio (MFRR$_{21.6/5}$) is a value obtained by dividing the melt index measured at 190° C. under a load of 21.6 kg by the melt index measured at 190° C. under a load of 5 kg in accordance with ASTM D 1238. Herein, the melt index (MI$_5$) measured at 190° C. under a load of 5 kg in accordance with ASTM D 1238 may be about 0.6 g/10 min to about 1.1 g/10 min, about 0.65 g/10 min to about 1.0 g/10 min, or about 0.7 g/10 min to about 0.95 g/10 min. In addition, the melt index (MI$_{21.6}$) measured at 190° C. under a load of 21.6 kg in accordance with ASTM D 1238 may be about 12 g/10 min to about 20 g/10 min, about 13 g/10 min to about 18.5 g/10 min, or about 14 g/10 min to about 17.5 g/10 min.

As described above, the polyethylene of the present disclosure is characterized by optimizing the molecular weight distribution (MWD, Mw/Mn) while having the entanglement molecular weight (Me) and the melt flow rate ratio in an optimum range.

The polyethylene may have a molecular weight distribution of about 5.5 to about 10, about 6 to about 9, or about 6.5 to about 8. This means that the molecular weight distribution of the polyethylene is narrow. When the molecular weight distribution is broad, a difference in the molecular weight between polyethylenes is large, so the chlorine content of the polyethylenes after the chlorination reaction may vary, and the uniform distribution of chlorine is difficult. In addition, when a low molecular weight component is melted, fluidity becomes high, so that pores of polyethylene particles may be blocked to reduce the chlorination productivity. However, since the polyethylene of the present disclosure has the molecular weight distribution as described above, the difference in molecular weight between polyethylenes after the chlorination reaction is not large, and chlorine may be uniformly substituted.

For examples, the molecular weight distribution (MWD, polydispersity index) may be measured using gel permeation chromatography (GPC, manufactured by Water). The MWD may be determined by measuring a weight average molecular weight (Mw) and a number average molecular weight (Mn), and then dividing the weight average molecular weight by the number average molecular weight.

Specifically, PL-GPC220 manufactured by Waters may be used as the gel permeation chromatography (GPC) instrument, and a Polymer Laboratories PLgel MIX-B 300 mm length column may be used. An evaluation temperature may be 160° C., and 1,2,4-trichlorobenzene may be used for a solvent at a flow rate of 1 mL/min. Each polyethylene sample may be pretreated by dissolving in 1,2,4-trichlorobenzene containing 0.0125% of BHT for 10 hours using a GPC analyzer (PL-GP220), and the sample with a concentration of 10 mg/10 mL may be supplied in an amount of 200 microleters (µL). Mw and Mn may be obtained using a calibration curve formed using a polystyrene standard. 9 kinds of the polystyrene standard are used with the molecular weight of 2000 g/mol, 10000 g/mol, 30000 g/mol, 70000 g/mol, 200000 g/mol, 700000 g/mol, 2000000 g/mol, 4000000 g/mol, 10000000 g/mol.

The polyethylene may have a weight average molecular weight of about 150000 g/mol to about 200000 g/mol, about 153000 g/mol to about 190000 g/mol, or about 155000 g/mol to about 185000 g/mol. This means that the polyethylene has a high molecular weight and a high content of a high molecular weight component, which leads to an effect of increasing the content of a linking molecule to be described later.

In addition, the polyethylene may have a density of about 0.953 g/cm$^3$ to 0.957 g/cm$^3$ or about 0.954 g/cm$^3$ to about 0.956 g/cm$^3$. This means that the polyethylene has a high content of crystalline part and is dense, and the crystal structure of the polyethylene is difficult to change during chlorination.

The polyethylene may have an elongational viscosity (210° C., 0.5 s) for cross-linked polyethylene of about 750000 Pa·s or more or about 750000 Pa·s to about 1200000 Pa·s, or about 800000 Pa·s or more or about 800000 Pa·s to about 1000000 Pa·s. The elongational viscosity (210° C., 0.5 s) for cross-linked PE may be about 750000 Pa·s or more in terms of securing excellent mechanical properties. A method for measuring the elongational viscosity (210° C., 0.5 s) for cross-linked polyethylene is as described in Test Example 1 to be described later.

For example, the elongational viscosity (210° C., 0.5 s) for cross-linked polyethylene of the polyethylene refers to an elongational viscosity of a compound sheet in which the polyethylene is cross-linked under 190° C., 10 min conditions, and represents a molecular structure having an excellent entanglement molecular weight and an excellent degree of cross-linking. The elongational viscosity (210° C., 0.5 s) for cross-linked polyethylene may be measured by pulling a molten sample at a Hencky rate of 0.1/s at 210° C. with ARES-G2 manufactured by TA Instruments and EVF (Elongation Viscosity Fixture) accessories.

In addition, the polyethylene may have an MDR torque (MH-ML, measured at 180° C. for 10 min) of about 6.5 Nm or more or about 6.5 Nm to about 9.5 Nm, about 6.8 Nm or more or about 6.8 Nm to about 8.5 Nm, or about 7 Nm or more or about 7 Nm to about 8 Nm. The MDR torque may be about 6.5 Nm or more in terms of securing excellent mechanical properties.

The MDR torque of the polyethylene refers to the degree of cross-linking. The higher the degree of cross-linking, the higher the MH-ML. The high MDR torque means an excellent cross-linking efficiency when the same cross-linking agent is applied. The MDR torque of the polyethylene may be measured, for example, using a moving die rheometer (MDR) by measuring a MH value and a ML value at 180° C. for 10 min, and subtracting the ML value from the MH value to calculate the MDR torque (MH-ML). Herein, the MH is a maximum vulcanizing torque measured at full cure, and the ML is a minimum vulcanizing torque stored. A method for measuring the MDR torque of the polyethylene is as described in Test Example 1 to be described later, and the detailed description is omitted.

According to another embodiment of the present disclosure, there is provided a method for preparing the above-described polyethylene.

The method for preparing the polyethylene according to the present disclosure may include the step of polymerizing ethylene in the presence of at least one first metallocene compound represented by the following Chemical Formula 1; and at least one second metallocene compound selected from the compounds represented by the following Chemical Formula 3:

[Chemical Formula 1]

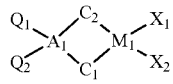

in Chemical Formula 1, $Q_1$ and $Q_2$ are the same as or different from each other, and are each independently hydrogen, halogen, $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl;

$A_1$ is carbon (C), silicon (Si), or germanium (Ge);

$M_1$ is a Group 4 transition metal;

$X_1$ and $X_2$ are the same as or different from each other, and are each independently halogen, $C_{1-20}$ alkyl, $C_{2-20}$ alkenyl, $C_{6-20}$ aryl, a nitro group, an amido group, $C_{1-20}$ alkylsilyl, $C_{1-20}$ alkoxy, or a $C_{1-20}$ sulfonate group; and one of $C_1$ and $C_2$ is represented by the following Chemical Formula 2a or 2b, and the other is represented by the following Chemical Formula 2c, 2d or 2e;

[Chemical Formula 2a]

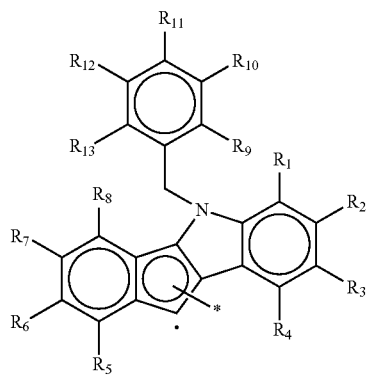

[Chemical Formula 2b]

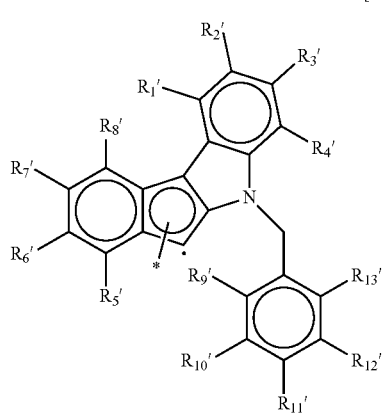

[Chemical Formula 2c]

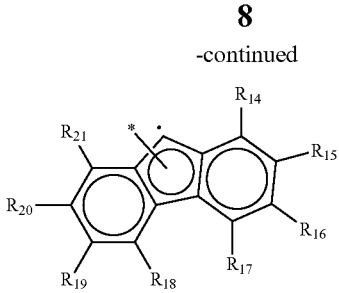

[Chemical Formula 2d]

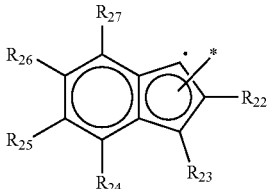

[Chemical Formula 2e]

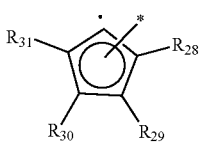

in Chemical Formulae 2a, 2b, 2c, 2d and 2e, $R_1$ to $R_{31}$ and $R_{1'}$ to $R_{13'}$ are the same as or different from each other, and are each independently hydrogen, halogen, $C_{1-20}$ alkyl, $C_{1-20}$ haloalkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-20}$ aryl, $C_{7-40}$ alkylaryl, or $C_{7-40}$ arylalkyl, provided that at least one of $R_9$ to $R_{13}$ and $R_{1'}$ to $R_{13'}$ is $C_{1-20}$ haloalkyl, two or more substituents adjacent to each other of $R_{14}$ to $R_{31}$ may be connected with each other to form a $C_{6-20}$ aliphatic or aromatic ring unsubstituted or substituted with a $C_{1-10}$ hydrocarbyl group;

• represents a site of binding to $A_1$; and

* represents a site of binding to $M_1$;

[Chemical Formula 3]

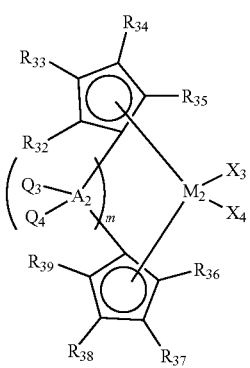

in Chemical Formula 3, at least one of $R_{32}$ to $R_{39}$ is —$(CH_2)_n$—OR, wherein R is $C_{1-6}$ linear or branched alkyl and n is an integer of 2 to 6;

in Chemical Formula 3, at least one of $R_{32}$ to $R_{39}$ is —$(CH_2)_n$—OR, wherein R is $C_{1-6}$ linear or branched alkyl and n is an integer of 2 to 4;

the rest of $R_{32}$ to $R_{39}$ are the same as or different from each other, and are each independently selected from the group consisting of hydrogen, halogen, $C_{1-20}$ alkyl, $C_{2-20}$ alkenyl, $C_{6-20}$ aryl, $C_{7-40}$ alkylaryl, and $C_{7-40}$ arylalkyl, or two or more substituents adjacent to each other may be connected with each other to form a $C_{6-20}$ aliphatic or aromatic ring unsubstituted or substituted with a $C_{1-10}$ hydrocarbyl group;

$Q_3$ and $Q_4$ are the same as or different from each other, and are each independently hydrogen, halogen, $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl;

$A_2$ is carbon (C), silicon (Si), or germanium (Ge);

$M_2$ is a Group 4 transition metal;

$X_3$ and $X_4$ are the same as or different from each other, and are each independently halogen, $C_{1-20}$ alkyl, $C_{2-20}$ alkenyl, $C_{6-20}$ aryl, a nitro group, an amido group, $C_{1-20}$ alkylsilyl, $C_{1-20}$ alkoxy, or a $C_{1-20}$ sulfonate group; and m is an integer of 0 or 1.

Unless otherwise specified herein, the following terms may be defined as follows.

The halogen may be fluorine (F), chlorine (Cl), bromine (Br) or iodine (I).

The hydrocarbyl group is a monovalent functional group in which a hydrogen atom is removed from hydrocarbon, and may include an alkyl group, an alkenyl group, an alkynyl group, an aryl group, an aralkyl group, an aralkenyl group, an aralkynyl group, an alkylaryl group, an alkenylaryl group, an alkynylaryl group, and the like. In addition, the $C_{1-30}$ hydrocarbyl group may be a $C_{1-20}$ hydrocarbyl group or a $C_{1-10}$ hydrocarbyl group. For example, the hydrocarbyl group may be linear, branched or cyclic alkyl. More specifically, the $C_{1-30}$ hydrocarbyl group may be a linear, branched or cyclic alkyl group such as a methyl group, an ethyl group, an n-propyl group, an iso-propyl group, an n-butyl group, an iso-butyl group, a tert-butyl group, an n-pentyl group, an n-hexyl group, an n-heptyl group and a cyclohexyl group; or an aryl group such as phenyl, biphenyl, naphthyl, anthracenyl, phenanthrenyl, or fluorenyl. Moreover, it may be alkylaryl such as methylphenyl, ethylphenyl, methylbiphenyl, and methylnaphthyl, or arylalkyl such as phenylmethyl, phenylethyl, biphenylmethyl, and naphthylmethyl. It may also be alkenyl such as allyl, ethenyl, propenyl, butenyl, and pentenyl.

In addition, the $C_{1-20}$ alkyl may be linear, branched or cyclic alkyl. Specifically, the $C_{1-20}$ alkyl may be $C_{1-20}$ linear alkyl; $C_{1-15}$ linear alkyl; $C_{1-5}$ linear alkyl; $C_{3-20}$ branched or cyclic alkyl; $C_{3-15}$ branched or cyclic alkyl; or $C_{3-10}$ branched or cyclic alkyl. For example, the $C_{1-20}$ alkyl may include methyl, ethyl, propyl, isopropyl, n-butyl, tert-butyl, pentyl, hexyl, heptyl, octyl, cyclopropyl, cyclobutyl, cyclopentyl, cyclohexyl, cycloheptyl, cyclooctyl, and the like, but the present disclosure is not limited thereto.

The $C_{2-20}$ alkenyl includes linear or branched alkenyl, and may specifically include allyl, ethenyl, propenyl, butenyl, pentenyl, and the like, but the present disclosure is not limited thereto.

The $C_{1-20}$ alkoxy may include methoxy, ethoxy, iso-propoxy, n-butoxy, tert-butoxy, cyclohexyloxy, and the like, but the present disclosure is not limited thereto.

The $C_{2-20}$ alkoxyalkyl group is a functional group in which at least one hydrogen of the above-mentioned alkyl is substituted with alkoxy, and it may include methoxymethyl, methoxyethyl, ethoxymethyl, iso-propoxymethyl, iso-propoxyethyl, iso-propoxypropyl, iso-propoxyhexyl, tert-butoxymethyl, tert-butoxyethyl, tert-butoxypropyl, tert-butoxyhexyl, and the like, but the present disclosure is not limited thereto.

The $C_{6-40}$ aryloxy may include phenoxy, biphenoxyl, naphthoxy, and the like, but the present disclosure is not limited thereto.

The $C_{7-40}$ aryloxyalkyl group is a functional group in which at least one hydrogen of the above-mentioned alkyl is substituted with aryloxy, and it may include phenoxymethyl, phenoxyethyl, phenoxyhexyl, and the like, but the present disclosure is not limited thereto.

The $C_{1-20}$ alkylsilyl or the $C_{1-20}$ alkoxysilyl is a functional group in which 1 to 3 hydrogens of —$SiH_3$ are substituted with 1 to 3 alkyl groups or alkoxy groups described above, and it may include alkylsilyl such as methylsilyl, dimethylsilyl, trimethylsilyl, dimethylethylsilyl, diethylmethylsilyl or dimethylpropylsilyl; alkoxysilyl such as methoxysilyl, dimethoxysilyl, trimethoxysilyl or dimethoxyethoxysilyl; or alkoxyalkylsilyl such as methoxydimethylsilyl, diethoxymethylsilyl or dimethoxypropylsilyl; and the like, but the present disclosure is not limited thereto.

The $C_{1-20}$ silylalkyl is a functional group in which at least one hydrogen of the above-mentioned alkyl is substituted with silyl, and it may include —$CH_2$—$SiH_3$, methylsilylmethyl or dimethylethoxysilylpropyl, and the like, but the present disclosure is not limited thereto.

In addition, the $C_{1-20}$ alkylene is the same as the above-mentioned alkyl except that it is a divalent substituent, and it may include methylene, ethylene, propylene, butylene, pentylene, hexylene, heptylene, octylene, cyclopropylene, cyclobutylene, cyclopentylene, cyclohexylene, cycloheptylene, cyclooctylene, and the like, but the present disclosure is not limited thereto.

The $C_{6-20}$ aryl may be a monocyclic, bicyclic or tricyclic aromatic hydrocarbon. For example, the $C_{6-20}$ aryl may include phenyl, biphenyl, naphthyl, anthracenyl, phenanthrenyl, fluorenyl, and the like, but the present disclosure is not limited thereto.

The $C_{7-20}$ alkylaryl may refer to a substituent in which at least one hydrogen of the aromatic ring is substituted with the above-mentioned alkyl. For example, the $C_{7-20}$ alkylaryl may include methylphenyl, ethylphenyl, methylbiphenyl, methylnaphthyl, and the like, but the present disclosure is not limited thereto.

The $C_{7-20}$ arylalkyl may refer to a substituent in which at least one hydrogen of the alkyl is substituted with the above-mentioned aryl. For example, the $C_{7-20}$ arylalkyl may include phenylmethyl, phenylethyl, biphenylmethyl, naphthylmethyl, and the like, but the present disclosure is not limited thereto.

In addition, the $C_{6-20}$ arylene is the same as the above-mentioned aryl except that it is a divalent substituent, and it may include phenylene, biphenylene, naphthylene, anthracenylene, phenanthrenylene, fluorenylene, and the like, but the present disclosure is not limited thereto.

The Group 4 transition metal may be titanium (Ti), zirconium (Zr), hafnium (Hf), or rutherfordium (Rf), and may specifically be titanium (Ti), zirconium (Zr), or hafnium (Hf). More specifically, it may be zirconium (Zr), or hafnium (Hf), but the present disclosure is not limited thereto.

Further, the Group 13 element may be boron (B), aluminum (Al), gallium (Ga), indium (In), or thallium (Tl), and may specifically be boron (B) or aluminum (Al), but the present disclosure is not limited thereto.

The first metallocene compound may be represented by the following Chemical Formula 1-1.

[Chemical Formula 1-1]

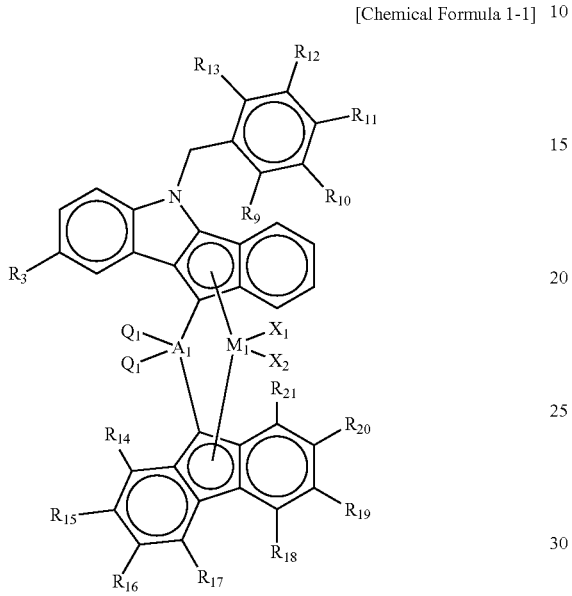

in Chemical Formula 1-1, $Q_1$, $Q_2$, $A_1$, $M_1$, $X_1$, $X_2$, $R_3$, and $R_9$ to $R_{21}$ are the same as defined in Chemical Formula 1.

Specifically, each of the $Q_1$ and $Q_2$ may be $C_{1-3}$ alkyl, or $C_{2-12}$ alkoxyalkyl, and preferably be methyl or tert-butoxyhexyl.

Specifically, each of the $X_1$ and $X_2$ may be halogen, and preferably be chloro.

Specifically, $A_1$ may be silicon (Si).

Specifically, $M_1$ may be zirconium (Zr) or hafnium (Hf), and preferably be zirconium (Zr).

Specifically, each of the $R_9$ to $R_{13}$ and $R_{9\square}$ to $R_{13\square}$ may be hydrogen, or $C_{1-6}$ haloalkyl, and preferably be hydrogen, or $C_{1-3}$ haloalkyl. For example, $R_9$ to $R_{12}$ or $R_{9\square}$ to $R_{12\square}$ may be hydrogen, and $R_{13}$ or $R_{13\square}$ may be trihalomethyl, preferably trifluoromethyl.

Specifically, $R_3$ may be $C_{1-6}$ linear or branched alkyl, or $C_{1-3}$ linear or branched alkyl, and preferably be methyl.

Specifically, each of the $R_{14}$ to $R_{21}$ may be hydrogen, or $C_{1-20}$ alkyl, or $C_{1-10}$ alkyl, or $C_{1-6}$ alkyl, or $C_{1-3}$ alkyl. Or, two or more substituents adjacent to each other of $R_{14}$ to $R_{21}$ may be connected with each other to form a $C_{6-20}$ aliphatic or aromatic ring substituted with $C_{1-3}$ alkyl.

Specifically, each of the $R_{22}$ to $R_{27}$ may be hydrogen, or $C_{1-20}$ alkyl, or $C_{1-10}$ alkyl, or $C_{1-6}$ alkyl, or $C_{1-3}$ alkyl.

The compound represented by the Chemical Formula 1 may be, for example, a compound represented by the following structural formula, but is not limited thereto.

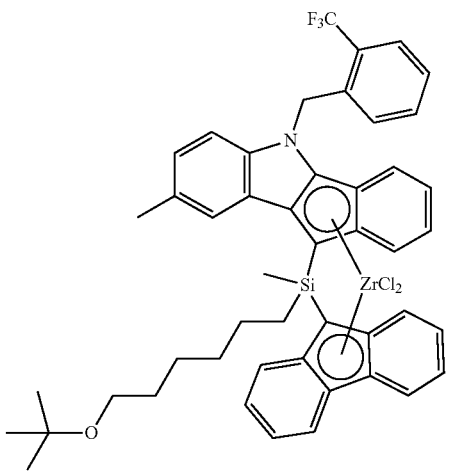

The first metallocene compound represented by the above structural formula may be synthesized by applying known reactions, and a detailed synthesis method may be referred to Examples.

In the method for preparing a polyethylene according to the present disclosure, at least one first metallocene compound represented by the Chemical Formula 1 or Chemical Formula 1-1 as described above is used together with at least one second metallocene compound described below. Thus, it is possible to achieve high productivity in the CPE process described below and excellent tensile strength during CPE compound processing by simultaneously optimizing the entanglement molecular weight (Me) of the polyethylene, the melt flow rate ratio ($MFRR_{21.6/5}$) and the molecular weight distribution (Mw/Mn).

Meanwhile, the second metallocene compound may be represented by any one of the following Chemical Formulae 3-1 to 3-4.

[Chemical Formula 3-1]

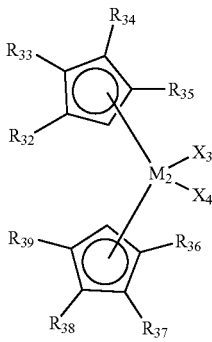

[Chemical Formula 3-2]

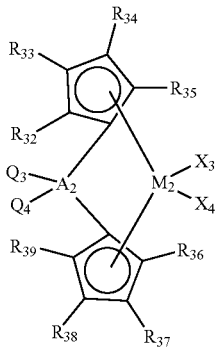

[Chemical Formula 3-3]

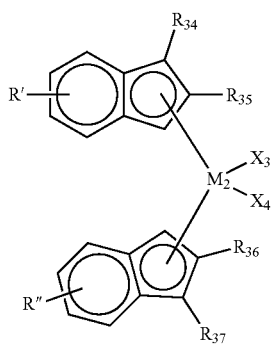

[Chemical Formula 3-4]

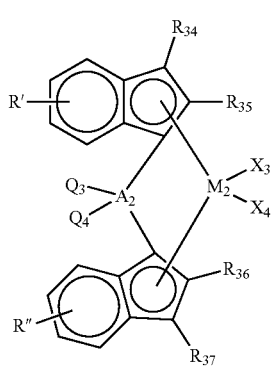

in Chemical Formulae 3-1 to 3-4, $Q_3$, $Q_4$, $A_2$, $M_2$, $X_3$, $X_4$, and $R_{32}$ to $R_{39}$ are the same as defined in Chemical Formula 3, and R' and R" are the same as or different from each other, and are each independently a $C_{1-10}$ hydrocarbyl group.

Specifically, each of the $Q_3$ and $Q_4$ may be $C_{1-3}$ alkyl, and preferably be methyl.

Specifically, each of the $X_3$ and $X_4$ may be halogen, and preferably be chloro.

Specifically, $A_2$ may be silicon (Si).

Specifically, $M_2$ may be zirconium (Zr) or hafnium (Hf), and preferably be zirconium (Zr).

Specifically, each of the $R_{32}$ to $R_{39}$ may be hydrogen, or $C_{1-20}$ alkyl, or $C_{1-10}$ alkyl, or $C_{1-6}$ alkyl, or $C_{2-6}$ alkyl substituted with $C_{1-6}$ alkoxy, or $C_{4-6}$ alkyl substituted with $C_{1-4}$ alkoxy. Or, two or more substituents adjacent to each other of $R_{32}$ to $R_{39}$ may be connected with each other to form a $C_{6-20}$ aliphatic or aromatic ring substituted with $C_{1-3}$ alkyl.

Preferably, each of the $R_{34}$ and $R_{37}$ may be $C_{1-6}$ alkyl, or $C_{2-6}$ alkyl substituted with $C_{1-6}$ alkoxy, or $C_{4-6}$ alkyl, or $C_{4-6}$ alkyl substituted with $C_{1-4}$ alkoxy. For example, each of the $R_{34}$ and $R_{37}$ may be n-butyl, n-pentyl, n-hexyl, tert-butoxy butyl, or tert-butoxy hexyl.

And, $R_{32}$, $R_{33}$, $R_{35}$, $R_{36}$, $R_{38}$, and $R_{39}$ may be hydrogen.

The compound represented by the Chemical Formula 3 may be, for example, a compound represented by one of the following structural formulae, but is not limited thereto.

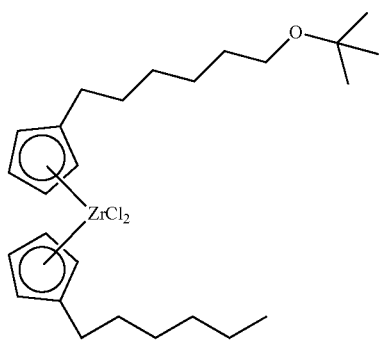

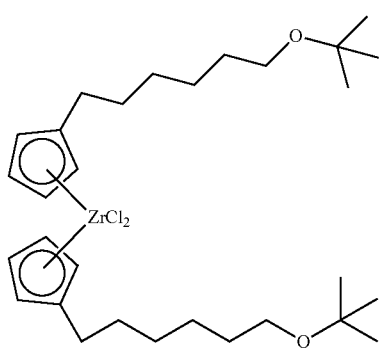

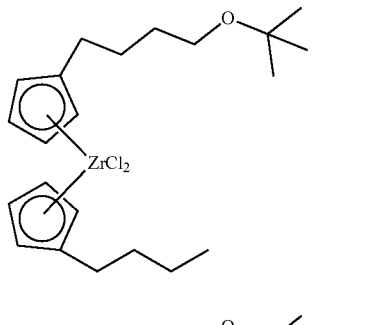

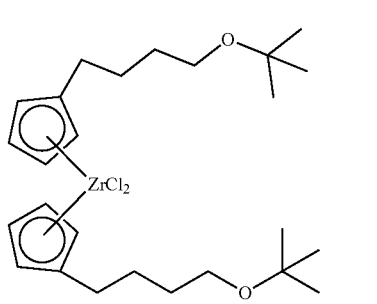

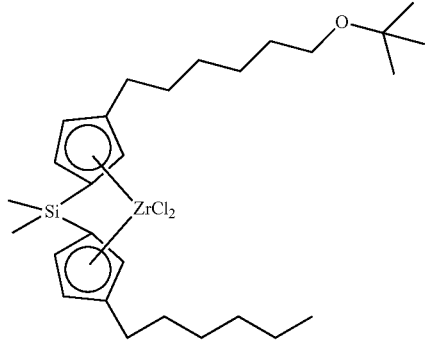

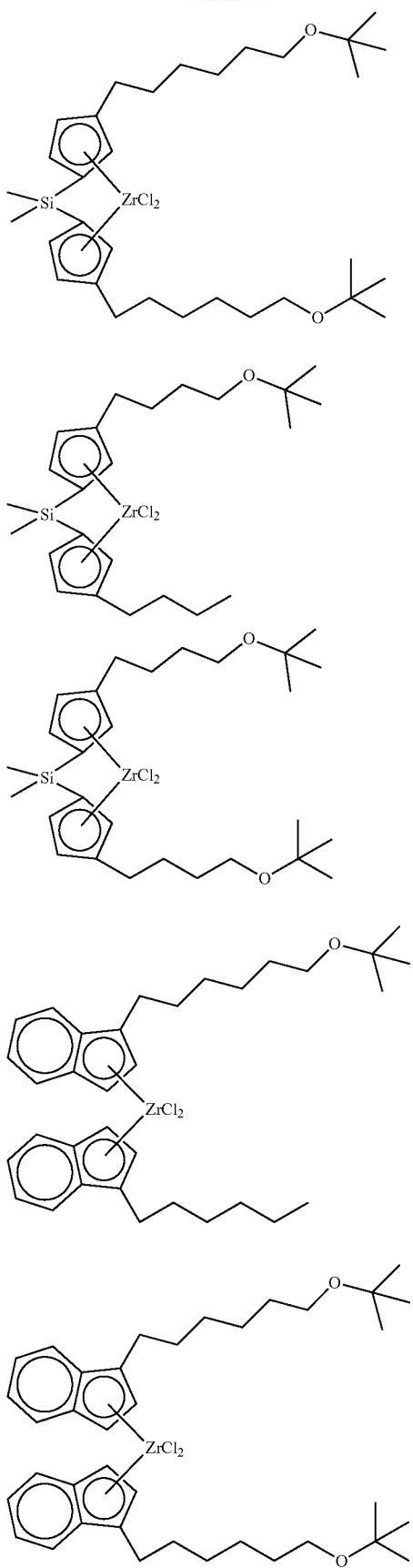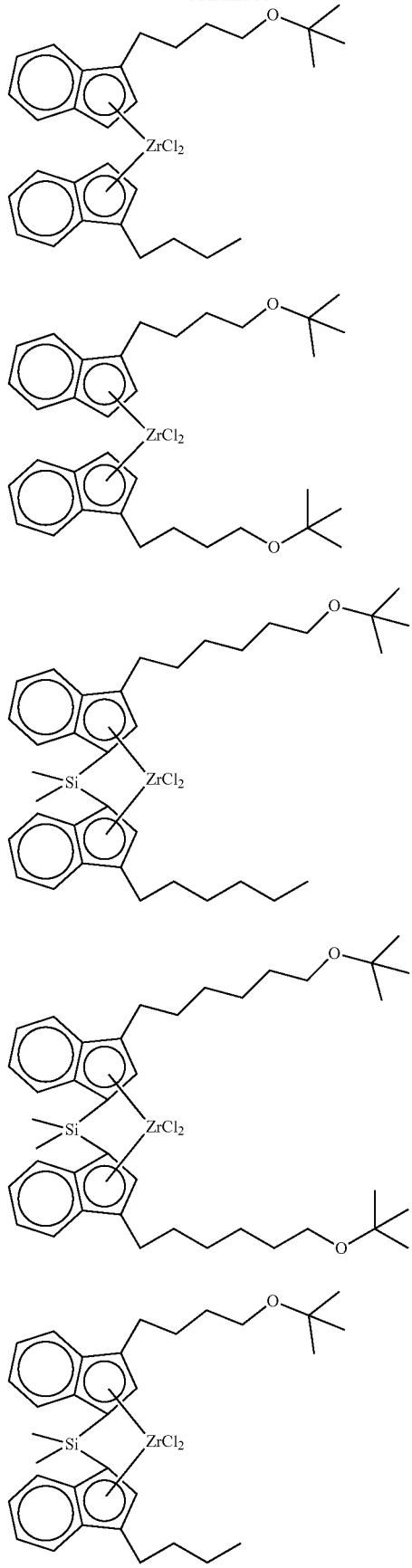

-continued

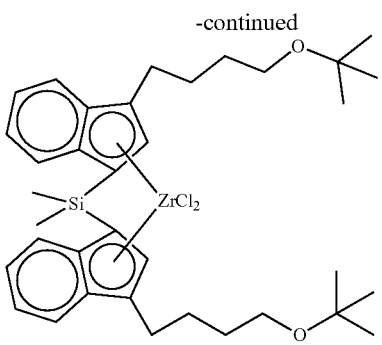

The metallocene catalyst used in the present disclosure may be supported on a support together with a cocatalyst compound.

In the supported metallocene catalyst according to the present disclosure, the cocatalyst supported on a support for activating the metallocene compound is an organometallic compound containing a Group 13 metal and is not particularly limited as long as it can be used in the polymerization of olefins in the presence of a general metallocene catalyst.

The cocatalyst is an organometallic compound containing a Group 13 metal and is not particularly limited as long as it can be used in the polymerization of ethylene in the presence of a general metallocene catalyst.

Specifically, the cocatalyst may be at least one selected from the group consisting of the compounds represented by the following Chemical Formulae 4 to 6:

$$-[Al(R_{41})-O]_c-$$ [Chemical Formula 4]

in Chemical Formula 4, $R_{41}$ are each independently halogen, $C_{1-20}$ alkyl, or $C_{1-20}$ haloalkyl, and c is an integer of 2 or more;

$$D(R_{51})_3$$ [Chemical Formula 5]

in Chemical Formula 5,

D is aluminum or boron, and $R_{51}$ are each independently hydrogen, halogen, $C_{1-20}$ hydrocarbyl or $C_{1-20}$ hydrocarbyl substituted with halogen, $$[L-H]^+[Q(E)_4]^- \text{ or } [L]^+[Q(E)_4]^-$$ [Chemical Formula 6]

in Chemical Formula 6,

L is a neutral or cationic Lewis base;

$[L-H]^+$ is a bronsted acid,

Q is $B^{3+}$ or $Al^{3+}$, and

E are each independently $C_{6-20}$ aryl or $C_{1-20}$ alkyl unsubstituted or substituted with a substituent selected from the group consisting of halogen, $C_{1-20}$ alkyl, $C_{1-20}$ alkoxy, and phenoxy.

The compound represented by Chemical Formula 4 may be alkylaluminoxane such as modified methyl aluminoxane (MMAO), methyl aluminoxane (MAO), ethylaluminoxane, isobutylaluminoxane, butylaluminoxane, and the like.

The alkyl metal compound represented by Chemical Formula 5 may be trimethylaluminum, triethylaluminum, triisobutylaluminum, tripropylaluminum, tributylaluminum, dimethylchloroaluminum, dimethylisobutylaluminum, dimethylethylaluminum, diethylchloroaluminum, triisopropylaluminum, tri-s-butylaluminum, tricyclopentylaluminum, tripentylaluminum, tri isopentylaluminum, trihexylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, or the like.

The compound represented by Chemical Formula 6 may be triethylammonium tetraphenylboron, tributylammonium tetraphenylboron, trimethylammonium tetraphenylboron, tripropylammonium tetraphenylboron, trimethylammonium tetra(p-tolyl)boron, tripropylammonium tetra(p-tolyl)boron, triethylammonium tetra(o,p-dimethylphenyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra (p-trifluoromethylphenyl)aluminum, tributylammonium tetrapentafluorophenylaluminum, N, N-diethylanilinium tetraphenylaluminum, N, N-diethylanilinium tetrapentafluorophenylaluminum, diethylammonium tetrapentafluorophenylaluminum, triphenylphosphonium tetraphenylaluminum, trimethylphosphonium tetraphenylaluminum, triphenylcarbonium tetraphenylboron, triphenylcarbonium tetraphenylaluminum, triphenylcarbonium tetra(p-trifluoromethylphenyl)boron, triphenylcarbonium tetrapentafluorophenylboron, or the like.

The cocatalyst may be supported in an amount of 5 mmol to 20 mmol based on 1 g of the support.

In the supported metallocene catalyst according to the present disclosure, a support containing hydroxyl groups on the surface may be used. Preferably, a support containing highly reactive hydroxyl groups and siloxane groups which is dried to remove moisture on the surface may be used.

The support may be silica, silica-alumina, or silica-magnesia dried at a high temperature, and commonly contain oxide, carbonate, sulfate, and nitrate such as $Na_2O$, $K_2CO_3$, $BaSO_4$, $Mg(NO_3)_2$, and the like.

A drying temperature of the support may preferably be 200° C. to 800° C., more preferably 300° C. to 600° C., and most preferably 300° C. to 400° C. When the drying temperature of the support is less than about 200° C., surface moisture may react with the cocatalyst due to excessive moisture. When it is greater than about 800° C., pores on the surface of the support may be combined to reduce the surface area, and a lot of hydroxyl groups may be lost on the surface and only siloxane groups may remain, thus decreasing the reaction sites with the cocatalyst, which is not preferable.

The amount of the hydroxyl groups on the surface of the support may preferably be 0.1 mmol/g to 10 mmol/g, more preferably 0.5 mmol/g to 5 mmol/g. The amount of the hydroxyl groups on the surface of the support may be controlled by the preparation method and conditions of the support, or drying conditions, for example, temperature, time, vacuum, spray drying, or the like.

When the amount of the hydroxyl groups are less than 0.1 mmol/g, the reaction sites with the cocatalyst may be little, and when it is greater than 10 mmol/g, there is a possibility of being derived from moisture other than hydroxyl groups on the surface of the support particle, which is not preferable.

In the supported metallocene catalyst of the present disclosure, a weight ratio of total transition metal included in the metallocene catalyst to the support may be 1:10 to 1:1000. When the support and the metallocene compounds are included within the above weight ratio, an optimal shape may be exhibited. In addition, a weight ratio of the cocatalyst compound to the support may be 1:1 to 1:100.

The ethylene polymerization reaction may be carried out using a continuous slurry polymerization reactor, a loop slurry reactor, a gas phase reactor, or a solution reactor.

In particular, the polyethylene according to the present disclosure may be prepared by homopolymerizing ethylene in the presence of at least one first metallocene compound represented by the Chemical Formula 1; and at least one second metallocene compound selected from the compounds represented by the Chemical Formula 3.

A weight ratio of the first metallocene compound and the second metallocene compound may be about 45:55 to about 60:40, about 48:52 to about 58:42, about 48:52 to about 55:45, or about 53:47 to about 55:45. The weight ratio of the catalyst precursor may be within the above range in terms of implementing a molecular structure having a high content of medium molecular weight to improve tensile strength, and to prepare a chlorinated polyethylene having excellent processability during extrusion. Specifically, the weight ratio when the melt index $MI_5$ of the polyethylene is 0.6 to 1.1 g/10 min may be about 45:55 or more in terms of securing the MFRR (21.6/5) of 16 or more, and may be about 60:40 or less in terms of securing the MFRR (21.6/5) of 25 or less.

In addition, the polyethylene may be prepared under the metallocene catalyst as described above while introducing hydrogen gas. Herein, the hydrogen gas may be introduced in an amount of about 70 ppm to about 120 ppm, or about 80 ppm to about 110 ppm. The amount of hydrogen gas may be within the above range in terms of allowing the polyethylene obtained after the polymerization to simultaneously exhibit the melt flow rate ratio and the molecular weight distribution in an optimum range. In particular, when the hydrogen gas is introduced in excess of 120 ppm, a wax content in the polymerization reaction solvent, for example, hexane may increase, resulting in agglomeration of particles during the chlorination reaction. In addition, in the polymerization process of the present disclosure, the amount of hydrogen may be adjusted to maintain a low wax content of 20% or less. The wax content may be measured by separating the polymerization product using a centrifugal separator, sampling 100 mL of the remaining hexane solvent, settling for 2 hours, and determining a volume ratio occupied by the wax.

In addition, the polymerization may be performed at a temperature of about 25° C. to about 500° C., preferably about 25° C. to about 200° C., more preferably about 50° C. to about 150° C. In addition, the polymerization may be performed at a pressure of about 1 kgf/cm² to about 100 kgf/cm², preferably about 1 kgf/cm² to about 50 kgf/cm², more preferably about 5 kgf/cm² to about 30 kgf/cm².

In addition, the supported metallocene catalyst may be dissolved or diluted in a C5 to C12 aliphatic hydrocarbon solvent such as pentane, hexane, heptane, nonane, decane and an isomer thereof, in an aromatic hydrocarbon solvent such as toluene and benzene, or in a hydrocarbon solvent substituted with chlorine such as dichloromethane and chlorobenzene, and injected. The solvent used herein is preferably used after removing a small amount of water or air, which acts as a catalyst poison, by treating with a small amount of alkyl aluminum. It is also possible to further use the cocatalyst.

According to another embodiment of the present disclosure, a chlorinated polyethylene (CPE) using the above-described polyethylene is provided.

The chlorinated polyethylene according to the present disclosure may be prepared by polymerizing ethylene in the presence of the supported metallocene catalyst described above, and then reacting the polyethylene with chlorine.

The reaction with chlorine may be carried out by dispersing the prepared polyethylene with water, an emulsifier and a dispersant, and then adding a catalyst and chlorine to react.

As the emulsifier, polyether or polyalkylene oxide may be used. The dispersant may be a polymer salt or an organic acid polymer salt, and the organic acid may be methacrylic acid or acrylic acid.

The catalyst may be a chlorination catalyst used in the art, and benzoyl peroxide may be used. The chlorine may be used alone, or may be mixed with an inert gas and then used.

The chlorination reaction may be performed at about 60° C. to about 150° C., about 70° C. to about 145° C., or about 80° C. to about 140° C. for about 10 minutes to about 10 hours, about 1 hour to about 9 hours, or about 2 hours to about 8 hours.

The chlorinated polyethylene prepared by the above reaction may be further subjected to a neutralization process, a washing process and/or a drying process, and thus may be obtained in a powder form.

The chlorinated polyethylene exhibits excellent uniformity in chlorine distribution in the chlorinated polyethylene because the polyethylene has a narrow molecular weight distribution. For example, the chlorinated polyethylene is prepared by reacting the polyethylene with chlorine in a slurry (water or HCl aqueous solution) at about 60° C. to about 150° C., and may have a Mooney viscosity (MV) measured at 121° C. of about 60 or more to about 85 or less, about 62 or more to about 82 or less, or about 65 or more to about 80 or less. In particular, when the Mooney viscosity of the chlorinated polyethylene exceeds about 85, the surface of CPE compound for wires and cables processed by compounding with inorganic additives and cross-linking agents may not be smooth and rough, and the gloss may be poor, resulting in a poor appearance.

In addition, the chlorinated polyethylene may have a tensile strength measured in accordance with ASTM D 412 of about 12 MPa or more or about 12 MPa to about 30 MPa, about 12.3 MPa or more or about 12.3 MPa to about 20 MPa, or about 12.5 MPa or more or about 12.5 MPa to about 15 MPa. The chlorinated polyethylene may have a tensile elongation measured in accordance with ASTM D 412 of about 500% or more or about 500% to about 2000%, or about 700% or more or about 700% to about 1500%, or about 900% or more or about 900% to about 1200%.

Specifically, the Mooney viscosity (MV), tensile strength and tensile elongation may be values measured for the chlorinated polyethylene obtained by heating about 500 kg to about 600 kg of polyethylene in a slurry state (water or aqueous HCl solution) from about 75° C. to about 85° C. to a final temperature of about 120° C. to about 140° C. at a rate of about 15° C./hr to about 18.5° C./hr, and then performing a chlorination reaction with gaseous chlorine at a final temperature of about 120° C. to about 140° C. for about 2 hours to about 5 hours. At this time, the chlorination reaction may be carried out by injecting the gaseous chlorine while raising the temperature and maintaining the pressure in the reactor at about 0.2 MPa to about 0.4 MPa at the same time, and a total amount of chlorine injected is about 650 kg to about 750 kg.

Methods for measuring the Mooney viscosity (MV), the tensile strength and the tensile elongation of the chlorinated polyethylene are as described in Test Example 2 to be described later, and the detailed description is omitted.

For example, the chlorinated polyethylene may have a chlorine content of about 20 wt % to about 50 wt %, about 31 wt % to about 45 wt %, or about 35 wt % to about 40 wt %. The chlorine content of the chlorinated polyethylene may be measured using combustion ion chromatography. For example, the combustion ion chromatography uses a combustion IC (ICS-5000/AQF-2100H) device equipped with an IonPac AS18 (4×250 mm) column. And the chlorine content may be measured using KOH (30.5 mM) as an eluent at a flow rate of 1 mL/min at an inlet temperature of 900° C. and an outlet temperature of 1000° C. The device conditions and measurement conditions for measuring the chlorine content are as described in Test Example 2 to be described later, the detailed description is omitted.

Specifically, the chlorinated polyethylene according to the present disclosure may have a Mooney viscosity (MV) of about 65 to about 80, a tensile strength of about 12.5 MPa or more, or about 12.5 MPa to about 15 MPa and a tensile elongation of about 900% or more, or about 900% to 1200% under a condition of 33 to 38 wt % of chlorine.

The chlorinated polyethylene may be, for example, a randomly chlorinated polyethylene.

The chlorinated polyethylene prepared according to the present disclosure is excellent in chemical resistance, weather resistance, flame retardancy, and processability, and is widely for wires and cables.

According to another embodiment of the present disclosure, a chlorinated polyethylene (CPE) compound including the above-described chlorinated polyethylene is provided.

In particular, the chlorinated polyethylene (CPE) compound of the present disclosure optimizes both the entanglement molecular weight (Me) and melt flow rate ratio (MFRR$_{21.6/5}$) of the polyethylene and achieves a high degree of cross-linking with a narrow molecular weight distribution, thereby minimizing a deterioration of processability during extrusion and exhibiting excellent mechanical properties.

The chlorinated polyethylene (CPE) compound is mainly used for wires and cables, and has excellent characteristics in processability, surface appearance and gloss of a molded product, and tensile strength for cross-linked compound.

The chlorinated polyethylene (CPE) compound may include about 1 wt % to about 80 wt %, about 10 wt % to about 70 wt %, or about 20 wt % to about 60 wt % of the chlorinated polyethylene prepared by the method as described above.

For example, the chlorinated polyethylene (CPE) compound may include 100 parts by weight to 280 parts by weight of an inorganic additive such as talc and carbon black and 1 part by weight to 40 parts by weight of a cross-linking agent, based on 100 parts by weight of the chlorinated polyethylene.

As a specific example, the chlorinated polyethylene (CPE) compound may include 25 wt % to 50 wt % of the chlorinated polyethylene, 50 wt % to 70 wt % of an inorganic additive such as talc and carbon black, and 0.5 wt % to 10 wt % of a cross-linking agent.

A CPE compound is prepared with an inorganic additive (for example, talc, carbon black, etc.), a plasticizer, and a cross-linking agent, and cross-linked at 140° C. to 200° C., followed by measuring a Mooney viscosity (MV) of the chlorinated polyethylene (CPE) compound at 100° C. using a Mooney viscometer. The Mooney viscosity may be about 30 to about 70, about 35 to about 68, or about 45 to about 65. In addition, the chlorinated polyethylene (CPE) compound may have a tensile strength measured in accordance with ASTM D 412 of about 8.5 MPa or more or about 8.5 MPa to about 30 MPa, about 12 MPa or more or about 12 MPa to about 20 MPa, or about 12.3 MPa or more or about 12.3 MPa to about 15 MPa. The chlorinated polyethylene may have a tensile elongation of about 300% or more or about 300% to about 1000%, about 350% or more or about 350% to about 800%, or about 380% or more or about 380% to about 600%.

In addition, the chlorinated polyethylene according to the present disclosure may produce a molded product by conventional methods in the art. For example, the molded product may be manufactured by roll-milling the chlorinated polyethylene and extruding it.

Hereinafter, preferred examples are provided to aid in understanding the present invention. However, these examples are for illustrative purposes only, and the invention is not intended to be limited by these examples.

Preparation of Catalyst Precursor

Preparation of the First Metallocene Compound

Synthesis Example 1

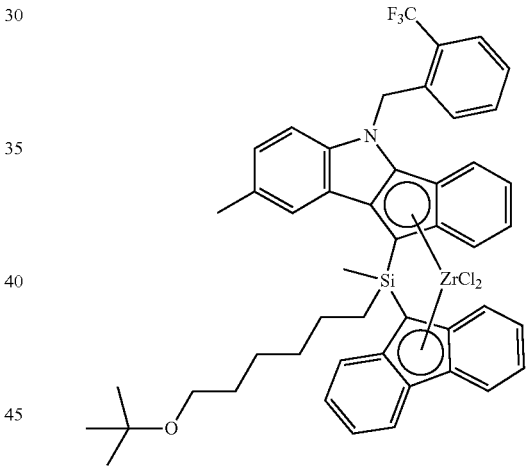

1-1 Preparation of Ligand Compound 2.9 g (7.4 mmol) of 8-methyl-5-(2-(trifluoromethyl)benzyl)-5,10-dihydroindeno[1,2-b]indole was dissolved in 100 mL of hexane and 2 mL (16.8 mmol) of MTBE (methyl tertialry butyl ether), and 3.2 mL (8.1 mmol) of 2.5 M n-BuLi hexane solution was added dropwise in a dry ice/acetone bath and stirred overnight at room temperature. In another 250 mL schlenk flask, 2 g (7.4 mmol) of (6-tert-butoxyhexyl)dichloro(methyl)silane was dissolved in 50 mL of hexane and added dropwise in a dry ice/acetone bath. Then, a lithiated slurry of 8-methyl-5-(2-(trifluoromethyl)benzyl)-5,10-dihydroindeno[1,2-b]indole was added dropwise through a cannula. After the injection, the mixture was slowly heated to room temperature and then stirred at room temperature overnight. At the same time, 1.2 g (7.4 mmol) of fluorene was also dissolved in 100 mL of tetrahydrofuran (THF), and 3.2 mL (8.1 mmol) of 2.5 M n-BuLi hexane solution was added dropwise in a dry ice/acetone bath, followed by stirring at room temperature overnight.

The reaction solution (Si solution) of 8-methyl-5-(2-(trifluoromethyl)benzyl)-5,10-dihydroindeno[1,2-b]indole and (6-(tert-butoxy)hexyl)dichloro(methyl)silane was confirmed by NMR sampling.

$^1$H NMR (500 MHz, CDCl$_3$): 7.74-6.49 (11H, m), 5.87 (2H, s), 4.05 (1H, d), 3.32 (2H, m), 3.49 (3H, s), 1.50-1.25 (8H, m), 1.15 (9H, s), 0.50 (2H, m), 0.17 (3H, d).

After confirming the synthesis, the lithiated solution of fluorene was slowly added dropwise to the Si solution in a dry ice/acetone bath and stirred overnight at room temperature. After the reaction, it was extracted with ether/water and residual moisture of the organic layer was removed with MgSO$_4$. Then, the solvent was removed under vacuum reduced pressure to obtain 5.5 g (7.4 mmol) of an oily ligand compound, which was confirmed by 1H-NMR.

$^1$H NMR (500 MHz, CDCl$_3$): 7.89-6.53 (19H, m), 5.82 (2H, s), 4.26 (1H, d), 4.14-4.10 (1H, m), 3.19 (3H, s), 2.40 (3H, m), 1.35-1.21 (6H, m), 1.14 (9H, s), 0.97-0.9 (4H, m), −0.34 (3H, t).

1-2 Preparation of Metallocene Compound 5.4 g (Mw 742.00, 7.4 mmol) of the ligand compound synthesized in the above 1-1 was dissolved in 80 mL of toluene and 3 mL (25.2 mmol) of MTBE, and 7.1 mL (17.8 mmol) of 2.5 M n-BuLi hexane solution was added dropwise in a dry ice/acetone bath, followed by stirring at room temperature overnight. 3.0 g (8.0 mmol) of ZrCl$_4$(THF)$_2$ was added to 80 mL of toluene to prepare a slurry. 80 mL of the toluene slurry of ZrCl$_4$(THF)$_2$ was transferred to a ligand-Li solution in a dry ice/acetone bath and stirred at room temperature overnight.

After the reaction mixture was filtered to remove LiCl, the toluene of the filtrate was removed by vacuum drying, and then 100 mL of hexane was added thereto, followed by sonication for 1 hour. This was filtered to obtain 3.5 g (yield 52 mol %) of a purple metallocene compound as a filtered solid.

$^1$H NMR (500 MHz, CDCl$_3$): 7.90-6.69 (9H, m), 5.67 (2H, s), 3.37 (2H, m), 2.56 (3H, s), 2.13-1.51 (11H, m), 1.17 (9H, s).

Comparative Synthesis Example 1

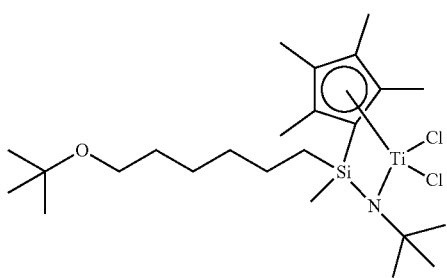

50 g of Mg was added to a 10 L reactor at room temperature, followed by 300 mL of THF. 0.5 g of I2 was added, and the reactor temperature was maintained at 50° C. After the reactor temperature was stabilized, 250 g of 6-t-butoxyhexyl chloride was added to the reactor at a rate of 5 mL/min using a feeding pump. It was observed that the reactor temperature rose by 4° C. to 5° C. with the addition of 6-t-butoxyhexylchloride. It was stirred for 12 hours while continuously adding 6-t-butoxyhexylchloride to obtain a black reaction solution. 2 mL of the black solution was taken to which water was added to obtain an organic layer. The organic layer was confirmed to be 6-t-butoxyhexane through $^1$H-NMR. From this, it was confirmed that Grignard reaction was well performed. Consequently, 6-t-butoxyhexyl magnesium chloride was synthesized.

500 g of MeSiCl$_3$ and 1 L of THF were introduced to a reactor, and then the reactor temperature was cooled down to −20° C. 560 g of the 6-t-butoxyhexyl magnesium chloride synthesized above was added to the reactor at a rate of 5 mL/min using a feeding pump. After completion of the feeding of Grignard reagent, the mixture was stirred for 12 hours while slowly raising the reactor temperature to room temperature. Then, it was confirmed that white MgCl$_2$ salt was produced. 4 L of hexane was added thereto and the salt was removed through a labdori to obtain a filtered solution. After the filtered solution was added to the reactor, hexane was removed at 70° C. to obtain a pale yellow liquid. The obtained liquid was confirmed to be methyl(6-t-butoxyhexyl)dichlorosilane through $^1$H-NMR.

$^1$H-NMR (CDCl$_3$): 3.3 (t, 2H), 1.5 (m, 3H), 1.3 (m, 5H), 1.2 (s, 9H), 1.1 (m, 2H), 0.7 (s, 3H).

1.2 mol (150 g) of tetramethylcyclopentadiene and 2.4 L of THF were added to the reactor, and then the reactor temperature was cooled down to −20° C. 480 mL of n-BuLi was added to the reactor at a rate of 5 ml/min using a feeding pump. After n-BuLi was added, the mixture was stirred for 12 hours while slowly raising the reactor temperature to room temperature. Then, an equivalent of methyl(6-t-butoxyhexyl)dichlorosilane (326 g, 350 mL) was rapidly added to the reactor. The mixture was stirred for 12 hours while slowly raising the reactor temperature to room temperature. Then, the reactor temperature was cooled to 0° C. again, and 2 equivalents of t-BuNH$_2$ was added. The mixture was stirred for 12 hours while slowly raising the reactor temperature to room temperature. Then, THF was removed. Thereafter, 4 L of hexane was added and the salt was removed through a labdori to obtain a filtered solution. The filtered solution was added to the reactor again, and hexane was removed at 70° C. to obtain a yellow solution. The yellow solution obtained above was confirmed to be methyl(6-t-butoxyhexyl)(tetramethylCpH)t-butylaminosilane through $^1$H-NMR.

TiCl$_3$(THF)$_3$ (10 mmol) was rapidly added to a dilithium salt of a ligand at −78° C., which was synthesized from n-BuLi and the ligand of dimethyl(tetramethylCpH)t-butylaminosilane in THF solution. While slowly heating the reaction solution from −78° C. to room temperature, it was stirred for 12 hours. Then, an equivalent of PbCl$_2$ (10 mmol) was added to the reaction solution at room temperature, and then stirred for 12 hours to obtain a dark black solution having a blue color. After removing THF from the resulting reaction solution, hexane was added to filter the product. Hexane was removed from the filtered solution, and then the product was confirmed to be tBu-O—(CH$_2$)$_6$(CH$_3$)Si(C$_5$(CH$_3$)$_4$)(tBu-N)TiCl$_2$ through $^1$H-NMR.

$^1$H-NMR (CDCl$_3$): 3.3 (s, 4H), 2.2 (s, 6H), 2.1 (s, 6H), 1.8-0.8 (m), 1.4 (s, 9H), 1.2 (s, 9H), 0.7 (s, 3H).

Preparation of Second Metallocene Compound

Synthesis Example 2

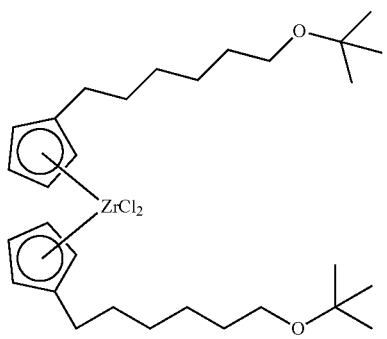

t-Butyl-O—(CH$_2$)$_6$—Cl was prepared by the method shown in Tetrahedron Lett. 2951 (1988) using 6-chlorohexanol, and reacted with cyclopentadienyl sodium (sodium Cp salt, NaCp) to obtain t-butyl-O—(CH$_2$)$_6$—C$_5$H$_5$ (yield 60%, b.p. 80° C./0.1 mmHg).

Further, t-butyl-O—(CH$_2$)$_6$—C$_5$H$_5$ was dissolved in THF at −78° C., and n-BuLi was slowly added thereto. Thereafter, it was heated to room temperature and reacted for 8 hours. The lithium salt solution synthesized as described above was slowly added to a suspension solution of ZrCl$_4$(THF)$_2$ (170 g, 4.50 mmol)/THF (30 mL) at −78° C., and further reacted for about 6 hours at room temperature. All volatiles were dried in vacuum and the resulting oily liquid material was filtered by adding a hexane solvent. The filtered solution was dried in vacuum, and hexane was added to obtain a precipitate at a low temperature (−20° C.). The obtained precipitate was filtered at a low temperature to obtain [tBu-O—(CH$_2$)$_6$—C$_5$H$_4$]$_2$ZrCl$_2$ in the form of a white solid (yield 92%).

$^1$H-NMR (300 MHz, CDCl$_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}$C-NMR (CDCl$_3$): 135.09, 116.66, 112.28, 72.42, 61.52, 30.66, 30.31, 30.14, 29.18, 27.58, 26.00.

Preparation of Supported Catalyst

Preparation Example 1: Preparation of Supported Catalyst 5.0 kg of toluene solution was added to a 20 L stainless steel (sus) high pressure reactor, and the reactor temperature was maintained at 40° C. After adding 1 kg of silica (SP948, manufactured by Grace Davison Co.) dehydrated at a temperature of 600° C. for 12 hours under vacuum to the reactor and dispersing the silica sufficiently, 128 g of the metallocene compound of Synthesis Example 2 was dissolved in toluene, added thereto and then reacted while stirring at 200 rpm at 40° C. for 2 hours. Thereafter, the stirring was stopped, followed by settling for 30 minutes and then decantation of the reaction solution.

2.5 kg of toluene was added to the reactor, and 9.4 kg of 10 wt % methylaluminoxane (MAO)/toluene solution was added thereto, followed by stirring at 200 rpm at 40° C. for 12 hours. Thereafter, the stirring was stopped, followed by settling for 30 minutes and then decantation of the reaction solution. After 3.0 kg of toluene was added and stirred for 10 minutes, the stirring was stopped, followed by settling for 30 minutes and then decantation of the toluene solution.

After 3.0 kg of toluene was added to the reactor, 142.3 g of the metallocene compound of Synthesis Example 1 was dissolved in 1 L of the toluene solution, and added thereto, followed by stirring at 200 rpm at 40° C. for 2 hours. At this time, a weight ratio of the metallocene compound of Synthesis Example 1 and the metallocene compound of Synthesis Example 2 was 53:47. After lowering the reactor temperature to room temperature, the stirring was stopped, followed by settling for 30 minutes and then decantation of the reaction solution.

2.0 kg of toluene was added to the reactor and stirred for 10 minutes. Then, the stirring was stopped, followed by settling for 30 minutes and then decantation of the reaction solution.

3.0 kg of hexane was added to the reactor, the hexane slurry was transferred to a filter drier, and the hexane solution was filtered. 910 g-SiO$_2$ supported hybrid catalyst was prepared by drying under reduced pressure at 40° C. for 4 hours.

Comparative Preparation Example 1: Preparation of Supported Catalyst

A supported hybrid catalyst was prepared in the same manner as in Preparation Example 1, except that the metallocene compound of Comparative Synthesis Example 1 was used instead of the metallocene compound of Synthesis Example 1, and a weight ratio of the metallocene compound of Comparative Synthesis Example 1 and the metallocene compound of Synthesis Example 2 was 50:50.

Comparative Preparation Example 2: Preparation of Supported Catalyst

A supported hybrid catalyst was prepared in the same manner as in Comparative Preparation Example 1, except that a weight ratio of the metallocene compound of Comparative Synthesis Example 1 and the metallocene compound of Synthesis Example 2 was changed to 70:30.

Preparation of Polyethylene

Example 1-1

The supported catalyst prepared in Preparation Example 1 was added to a single slurry polymerization process to prepare a high density polyethylene.

First, a 100 m$^3$ reactor was charged with a flow rate of 25 ton/hr of hexane, 10 ton/hr of ethylene, 106 ppm of hydrogen, and 10 kg/hr of triethylaluminum (TEAL), and a supported hybrid metallocene catalyst of Preparation Example 1 was injected to the reactor at 0.5 kg/hr. Thereafter, the ethylene was continuously reacted in a hexane slurry state at a reactor temperature of 82° C. and a pressure of 7.0 kg/cm$^2$ to 7.5 kg/cm$^2$. Then, it was subjected to solvent removal and drying to prepare a high density polyethylene in a powder form.

Examples 1-2 to 1-7

High density polyethylenes of Examples 1-2 to 1-7 having a powder form were prepared in the same manner as in Example 1-1, except that the input amount of hydrogen was changed to 99 ppm, 93 ppm, 80 ppm, 86 ppm, 110 ppm, and 95 ppm, respectively.

Comparative Example 1-1

A high density polyethylene (HDPE) commercial product (CE2080, manufactured by LG Chem), which is prepared using a Ziegler-Natta catalyst, was prepared for Comparative Example 1-1.

Comparative Example 1-2

A high density polyethylene (HDPE) commercial product (CE2030K, manufactured by LG Chem), which is prepared using a Ziegler-Natta catalyst, was prepared for Comparative Example 1-2.

Comparative Example 1-3

A high density polyethylene having a powder form was prepared in the same manner as in Example 1-1, except that 20 ppm of hydrogen was injected and the supported catalyst prepared in Comparative Preparation Example 1 was used instead of the supported catalyst prepared in Preparation Example 1.

Comparative Example 1-4

A high density polyethylene having a powder form was prepared in the same manner as in Example 1-1, except that 30 ppm of hydrogen was injected and the supported catalyst prepared in Comparative Preparation Example 2 was used.

Comparative Example 1-5

A high density polyethylene (HDPE) commercial product (CE2080M/27169, manufactured by LG Chem), which is prepared using a metallocene catalyst, was prepared for Comparative Example 1-5.

Test Example 1

Physical properties of the polyethylenes prepared in Examples 1-1 to 1-7 and Comparative Examples 1-1 to 1-5 were measured by the following method, and the results are shown in Table 1 below.

1) Melt Index (MI, g/10 Min)

The melt index ($MI_5$, $MI_{21.6}$) was measured under a load of 5 kg, and 21.6 kg, respectively, in accordance with ASTM D 1238 at a temperature of 190° C. A weight (g) of polymer melted for 10 minutes was recorded as the melt index.

2) Melt Flow Rate Ratio (MFRR, $MI_{21.6/5}$)

The melt flow rate ratio (MFRR, $MI_{21.6/5}$) was obtained by dividing the melt index measured at 190° C. under a load of 21.6 kg by the melt index measured at 190° C. under a load of 5 kg in accordance with ASTM D 1238.

3) Density

The density (g/cm³) was measured in accordance with ASTM D 1505.

4) Molecular Weight Distribution (MWD, Polydispersity Index)

The molecular weight distribution (MWD) was determined by measuring a weight average molecular weight (Mw) and a number average molecular weight (Mn) using gel permeation chromatography (GPC, manufactured by Waters), and then dividing the weight average molecular weight by the number average molecular weight.

Specifically, PL-GPC220 manufactured by Waters was used as the gel permeation chromatography (GPC) instrument, and a Polymer Laboratories PLgel MIX-B 300 mm length column was used. An evaluation temperature was 160° C., and 1,2,4-trichlorobenzene was used for a solvent at a flow rate of 1 mL/min. Each polyethylene sample was pretreated by dissolving in 1,2,4-trichlorobenzene containing 0.0125% of BHT for 10 hours using a GPC analyzer (PL-GP220), and the sample with a concentration of 10 mg/10 mL was supplied in an amount of 200 μL. Mw and Mn were obtained using a calibration curve formed using a polystyrene standard. 9 kinds of the polystyrene standard were used with the molecular weight of 2000 g/mol, 10000 g/mol, 30000 g/mol, 70000 g/mol, 200000 g/mol, 700000 g/mol, 2000000 g/mol, 4000000 g/mol, 10000000 g/mol.

5) Entanglement Molecular Weight (Me)

The entanglement molecular weight (Me) was calculated from a storage modulus and a loss modulus of the sample measured at a temperature of 150° C. to 230° C. at an angular frequency of 0.05 rad/s to 500 rad/s at 0.5% strain with a rotational rheometer.

Specifically, a storage modulus and a loss modulus of the polyethylene sample according to Examples and Comparative Examples were measured at a temperature of 150° C. to 230° C. at an angular frequency of 0.05 rad/s to 500 rad/s at 0.5% strain with a rotational rheometer. Then, a plateau modulus ($G_N^0$) was obtained from them and the entanglement molecular weight (Me) was calculated according to the following Equation 1.

$$M_e = (\rho RT)/G_N^0 \quad \text{[Equation 1]}$$

in Equation 1, $\rho$ is a density (kg/m³) of polyethylene,

R is a gas constant of polyethylene (8.314 Pa·m³/mol·K),

T is an absolute temperature (K) of the measured temperature, and $G_N^0$ is a plateau modulus ($G_N^0$) of polyethylene.

Herein, the plateau modulus ($G_N^0$) of Equation 1 is a storage modulus when the loss modulus has a minimum value in a region where the storage modulus is greater than the loss modulus.

6) MDR Torque (MH-ML, Nm)

The MDR torque of the polyethylene samples according to Examples 1-1 to 1-7 and Comparative Examples 1-1 to 1-5 was measured using Alpha Technologies Production MDR (Moving Die Rheometer).

Specifically, a sample sheet was prepared with 100 g of each polyethylene sample according to Examples 1-1 to 1-7 and Comparative Examples 1-1 to 1-5, 0.4 g of a phenolic antioxidant (AO), and 1.2 g of a cross-linking agent (DCP, dicumyl peroxide) at 140° C. for 10 min. Then, a MH value and a ML value were measured at 180° C. for 10 min, and the MDR torque (MH-ML) was calculated by subtracting the ML value from the MH value. Herein, the MH is a maximum vulcanizing torque measured at full cure, and the ML is a minimum vulcanizing torque stored.

7) Elongational Viscosity (210° C., 0.5 s, ×10³ Pa·s) for Cross-Linked Polyethylene The elongational viscosity for cross-linked PE according to Examples and Comparative Examples was measured at a Hencky rate of 0.1/s at 210° C. using EVF (Elongation Viscosity Fixture) which is attached to ARES rheometer.

Specifically, a sample sheet was prepared by cross-linking 100 g of each polyethylene sample according to Examples 1-1 to 1-7 and Comparative Examples 1-1 to 1-5, 0.4 g of a phenolic antioxidant (AO), and 1.2 g of a cross-linking agent (DCP, dicumyl peroxide) at 190° C. for 10 min. Then, the elongational viscosity (210° C., 0.5 s, ×10³) for cross-linked polyethylene was measured by pulling a molten sample at a Hencky rate of 0.1/s at 210° C. with ARES-G2 manufactured by TA Instruments (New Castle, Delaway, USA) and EVF (Elongation Viscosity Fixture) accessories.

TABLE 1

|  |  | MI (5 kg, 190° C., g/10 min) | MFRR (21.6/5) | Density (g/cm$^3$) | Mw (×10$^3$ g/mol) | MWD (Mw/Mn) | Me (g/mol) | MDR torque (MH-ML, Nm) | Elongational viscosity for cross-linked PE (210° C., 0.5 s, ×10$^3$, Pa · s) |
|---|---|---|---|---|---|---|---|---|---|
| Examples | 1-1 | 0.91 | 18.1 | 0.955 | 163 | 6.9 | 12600 | 7.9 | 890 |
|  | 1-2 | 0.86 | 19.6 | 0.955 | 167 | 7 | 11100 | 7.6 | 880 |
|  | 1-3 | 0.81 | 19.4 | 0.955 | 170 | 7.1 | 10500 | 7.6 | 910 |
|  | 1-4 | 0.70 | 20.2 | 0.955 | 182 | 7.5 | 9800 | 7.4 | 940 |
|  | 1-5 | 0.75 | 19.9 | 0.955 | 173 | 7.3 | 10200 | 7.5 | 920 |
|  | 1-6 | 0.94 | 18.1 | 0.955 | 159 | 7.3 | 11600 | 7.6 | 870 |
|  | 1-7 | 0.83 | 17 | 0.955 | 168 | 6.7 | 10200 | 7.6 | 890 |
| Comparative Examples | 1-1 | 1.3 | 15.3 | 0.958 | 204 | 10.6 | 13600 | 5 | 610 |
|  | 1-2 | 1.7 | 17.2 | 0.958 | 191 | 13.8 | 18700 | 4.1 | 400 |
|  | 1-3 | 1.8 | 8.4 | 0.938 | 124 | 3.2 | 28600 | — | — |
|  | 1-4 | 0.81 | 11.2 | 0.951 | 156 | 3.7 | 21800 | — | — |
|  | 1-5 | 1.76 | 22.9 | 0.951 | 193 | 14.2 | 8700 | 6.2 | 590 |

As shown in Table 1 above, Examples had the entangled molecular weight (Me) of 9800 g/mol to 12600 g/mol, the melt flow rate ratio (MFRR$_{21.6/5}$) of 18.1 to 20.2, and the molecular weight distribution (MWD, Mw/Mn) of 6.9 to 7.3, and it was confirmed that Examples had excellent processability during extrusion with a high tensile strength when applied to wires and cables, in contrast to Comparative Examples.

Test Example 2

Chlorinated polyethylenes of Examples 2-1 to 2-7 and Comparative Example 2-1 to 2-5 were prepared using the polyethylenes prepared in Examples 1-1 to 1-7 and Comparative Examples 1-1 to 1-5.

[Preparation of Chlorinated Polyethylene]

5000 L of water and 550 kg of high density polyethylene prepared in Example 1-1 were added to a reactor, followed by sodium polymethacrylate as a dispersant, oxypropylene and oxyethylene copolyether as an emulsifier, and benzoyl peroxide as a catalyst. Then, the temperature was raised from 80° C. to 132° C. at a rate of 17.3° C./hr and chlorination was carried out by injecting gaseous chlorine at a final temperature of 132° C. for 3 hours. At this time, the chlorination reaction was performed by injecting the gaseous chlorine at a reactor pressure of 0.3 MPa while raising the temperature, and a total input of chlorine was 700 kg. The chlorinated reactant was neutralized with NaOH for 4 hours, washed again with running water for 4 hours, and finally dried at 120° C. to prepare a chlorinated polyethylene in a powder form.

In addition, chlorinated polyethylenes having a powder form were also prepared in the same manner as described above, using the polyethylenes prepared in Examples 1-2 to 1-7 and Comparative Examples 1-1 to 1-5.

As described above, physical properties of the chlorinated polyethylenes of Examples 2-1 to 2-7 and Comparative Examples 2-1 to 2-5 prepared using the polyethylenes of Examples 1-1 to 1-7 and Comparative Examples 1-1 to 1-5 were measured by the following method, and the results are shown in Table 2 below.

1) Chlorine Content of CPE (%)

The chlorine content was measured using combustion ion chromatography. Specific measuring devices, conditions and methods are as follows.

Measuring device: Combustion IC (ICS-5000/AQF-2100H)

Measuring method

Combustion temperature: Inlet temperature 900° C., Outlet temperature 1000° C.

Gas flow rate: Ar gas 200 m L/min, O$_2$ gas 400 mL/min

Amount of moisturization: 0.23 mL/min, internal standard material (PO$_4^{3-}$): 20 mg/kg Absorbent (H$_2$O$_2$): 900 mg/kg, absorbent volume: 5 mL, final dilution volume: 17 mL Column: IonPac AS18 (4×250 mm)

Eluent: KOH (30.5 mM)

Eluent flow rate: 1 mL/min

Detector: Suppressed Conductivity Detector, SRS Current: 76 mA

Injection volume: 100 μL,

Measuring mode: Isocratic

Experimental method: About 0.01 g to about 0.002 g of a sample was accurately measured in a sample boat and analyzed by combustion IC.

2) MV (Mooney Viscosity) of CPE

Wrap a rotor in a Mooney viscometer with a CPE sample and close a die. After preheating to 121° C. for 1 min, the rotor was rotated for 4 min to measure MV (Mooney viscosity, 121° C., ML1+4).

3) Tensile Strength (MPa) and Tensile Elongation (%) of CPE

The tensile strength (MPa) and tensile elongation (%) of CPE were measured under a condition of 500 mm/min in accordance with ASTM D 412.

TABLE 2

|  |  | Chlorine content (wt %) | MV of CPE (121° C., ML1 + 4) | Tensile strength of CPE (MPa) | Tensile elongation of CPE (%) |
|---|---|---|---|---|---|
| Examples | 2-1 | 38.4 | 68 | 12.6 | 1010 |
|  | 2-2 | 38.2 | 72 | 13.1 | 980 |
|  | 2-3 | 38.7 | 74 | 13.4 | 970 |
|  | 2-4 | 38.1 | 80 | 13.7 | 910 |
|  | 2-5 | 38.6 | 77 | 13.6 | 930 |
|  | 2-6 | 38.4 | 65 | 12.5 | 1010 |
|  | 2-7 | 37.9 | 72 | 13.2 | 990 |
| Comparative Examples | 2-1 | 37.9 | 70 | 11.5 | 830 |
|  | 2-2 | 38.5 | 50 | 9.8 | 890 |
|  | 2-3 | 38.8 | 95 | — | — |
|  | 2-4 | 38.7 | 95 | — | — |
|  | 2-5 | 37.8 | 51 | 10.1 | 910 |

As shown in Table 2, it was confirmed that Examples had the MV (Mooney viscosity) of CPE of 65 to 80, and the tensile strength of 12.5 MPa to 13.7 MPa, thereby ensuring excellent mechanical properties, in contrast to Comparative Examples. In particular, Examples 2-1 and 2-4 could have a higher tensile strength with the MV (Mooney viscosity) of the equivalent level or less compared to Comparative Example 2-1, so that it is possible to prevent processability during extrusion from lowering.

Test Example 3

25 to 50 wt % of the chlorinated polyethylenes prepared using the polyethylenes prepared in Examples 1-1 to 1-7 and Comparative Examples 1-1, 1-2, and 1-5, and 50 to 70 wt % of an inorganic additive such as talc and carbon black, and 0.5 to 10 wt % of a cross-linking agent were compounded and processed to prepare CPE compound specimens of Examples 3-1 to 3-7 and Comparative Examples 3-1, 3-2, and 3-5.

As described above, physical properties of the CPE compounds of Examples 3-1 to 3-7 and Comparative Examples 3-1, 3-2 and 3-5 including the chlorinated polyethylenes prepared using the polyethylenes of Examples 1-1 to 1-7 and Comparative Examples 1-1, 1-2, and 1-5 were measured by the following method, and the results are shown in Table 3 below.

1) MV (Mooney Viscosity) of CPE Compound

Wrap a rotor in a Mooney viscometer with a CPE compound sample and close a die. After preheating to 100° C. for 1 min, the rotor was rotated for 4 min to measure MV (Mooney viscosity, 100° C., ML1+4).

2) Tensile Strength (MPa) and Tensile Elongation (%) of CPE Compound

The tensile strength (MPa) and tensile elongation (%) of CPE compound were measured under a condition of 500 mm/min in accordance with ASTM D 412.

TABLE 3

| | | MV of CPE compound (100° C., ML1 + 4) | Tensile strength of CPE compound (MPa) | Tensile elongation of CPE compound (%) |
|---|---|---|---|---|
| Examples | 3-1 | 49 | 12.7 | 470 |
| | 3-2 | 51 | 13.1 | 460 |
| | 3-3 | 54 | 13.3 | 430 |
| | 3-4 | 61 | 13.8 | 380 |
| | 3-5 | 57 | 13.6 | 410 |
| | 3-6 | 48 | 12.4 | 510 |
| | 3-7 | 52 | 13.2 | 480 |
| Comparative Examples | 3-1 | 51 | 11.9 | 470 |
| | 3-2 | 43 | 10.7 | 440 |
| | 3-5 | 41 | 10.9 | 460 |

As shown in Table 3, it was confirmed that Examples had the MV (Mooney viscosity) of CPE compound of 48 to 61, and the tensile strength of 12.4 MPa to 13.8 MPa, thereby ensuring excellent mechanical properties which is very effective for wires and cables, in contrast to Comparative Examples. In particular, Examples 3-1 and 3-7 could have a higher tensile strength with the MV (Mooney viscosity) of the equivalent level or less compared to Comparative Example 3-1, thereby minimizing a degradation in processability during extrusion and providing a high strength rubber hose, cable sheath, etc.

The invention claimed is:

1. A polyethylene having an entanglement molecular weight of 9500 g/mol to 13000 g/mol, a melt flow rate ratio (MFRR$_{21.6/5}$, a value obtained by dividing the melt index measured at 190° C. under a load of 21.6 kg by the melt index measured at 190° C. under a load of 5 kg in accordance with ASTM D 1238) of 16 to 25, and a molecular weight distribution (Mw/Mn) of 5.5 to 10.

2. The polyethylene according to claim 1, wherein the polyethylene has MI$_5$ (a melt index measured at 190° C. under a load of 5 kg) of 0.6 g/10 min to 1.1 g/10 min.

3. The polyethylene according to claim 1, wherein the polyethylene has a weight average molecular weight of 150000 g/mol to 200000 g/mol.

4. The polyethylene according to claim 1, wherein the polyethylene has a density of 0.953 g/cm$^3$ to 0.957 g/cm$^3$.

5. The polyethylene according to claim 1, wherein the polyethylene has an elongational viscosity (210° C., 0.5 s) for cross-linked polyethylene of 750000 Pa·s or more.

6. The polyethylene according to claim 1, wherein the polyethylene has an MDR torque (MH-ML, measured at 180° C. for 10 min) of 6.5 Nm or more.

7. A method for preparing the polyethylene according to claim 1, comprising the step of polymerizing ethylene in the presence of at least one first metallocene compound represented by the following Chemical Formula 1; and at least one second metallocene compound selected from the compounds represented by the following Chemical Formula 3:

[Chemical Formula 1]

in Chemical Formula 1,

Q$_1$ and Q$_2$ are the same as or different from each other, and are each independently hydrogen, halogen, C$_{1-20}$ alkyl, C$_{2-20}$ alkenyl, C$_{2-20}$ alkoxyalkyl, C$_{6-20}$ aryl, C$_{7-40}$ alkylaryl, or C$_{7-40}$ arylalkyl;

A$_1$ is carbon, silicon, or germanium;

M$_1$ is a Group 4 transition metal;

X$_1$ and X$_2$ are the same as or different from each other, and are each independently halogen, C$_{1-20}$ alkyl, C$_{2-20}$ alkenyl, C$_{6-20}$ aryl, a nitro group, an amido group, C$_{1-20}$ alkylsilyl, C$_{1-20}$ alkoxy, or a C$_{1-20}$ sulfonate group; and one of C$_1$ and C$_2$ is represented by the following Chemical Formula 2a or 2b, and the other is represented by the following Chemical Formula 2c, 2d or 2e;

[Chemical Formula 2a]

[Chemical Formula 2b]

[Chemical Formula 2c]

[Chemical Formula 2d]

[Chemical Formula 2e]

in Chemical Formulae 2a, 2b, 2c, 2d and 2e, $R_1$ to $R_{31}$ and $R_{1\square}$ to $R_{13\square}$ are the same as or different from each other, and are each independently hydrogen, halogen, $C_{1-20}$ alkyl, $C_{1-20}$ haloalkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-20}$ aryl, $C_{7-40}$ alkylaryl, or $C_{7-40}$ arylalkyl, provided that at least one of $R_9$ to $R_{13}$ and $R_{9\square}$ to $R_{13\square}$ is $C_{1-20}$ haloalkyl, or two or more $R_{14}$ to $R_{31}$ that are adjacent to each other are connected with each other to form a $C_{6-20}$ aliphatic or aromatic ring unsubstituted or substituted with a $C_{1-10}$ hydrocarbyl group;

• represents a site of binding to $A_1$; and represents a site of binding to $M_1$;

[Chemical Formula 3]

in Chemical Formula 3, at least one of $R_{32}$ to $R_{39}$ is —$(CH_2)_n$—OR, wherein R is $C_{1-6}$ linear or branched alkyl and n is an integer of 2 to 6;

the rest of $R_{32}$ to $R_{39}$ if present are the same as or different from each other, and are each independently selected from the group consisting of hydrogen, halogen, $C_{1-20}$ alkyl, $C_{2-20}$ alkenyl, $C_{6-20}$ aryl, $C_{7-40}$ alkylaryl, and $C_{7-40}$ arylalkyl, or two or more of $R_{32}$ to $R_{39}$ that are adjacent to each other are connected with each other to form a $C_{6-20}$ aliphatic or aromatic ring unsubstituted or substituted with a $C_{1-10}$ hydrocarbyl group;

$Q_3$ and $Q_4$ are the same as or different from each other, and are each independently hydrogen, halogen, $C_{1-20}$ alkyl, $C_{2-20}$ alkenyl, $C_{2-20}$ alkoxyalkyl, $C_{6-20}$ aryl, $C_{7-40}$ alkylaryl, or $C_{7-40}$ arylalkyl;

$A_2$ is carbon, silicon, or germanium;

$M_2$ is a Group 4 transition metal;

$X_3$ and $X_4$ are the same as or different from each other, and are each independently halogen, $C_{1-20}$ alkyl, $C_{2-20}$ alkenyl, $C_{6-20}$ aryl, a nitro group, an amido group, $C_{1-20}$ alkylsilyl, $C_{1-20}$ alkoxy, or a $C_{1-20}$ sulfonate group; and m is an integer of 0 or 1.

8. The method for preparing the polyethylene according to claim 7, wherein the first metallocene compound is represented by the following Chemical Formula 1-1:

[Chemical Formula 1-1]

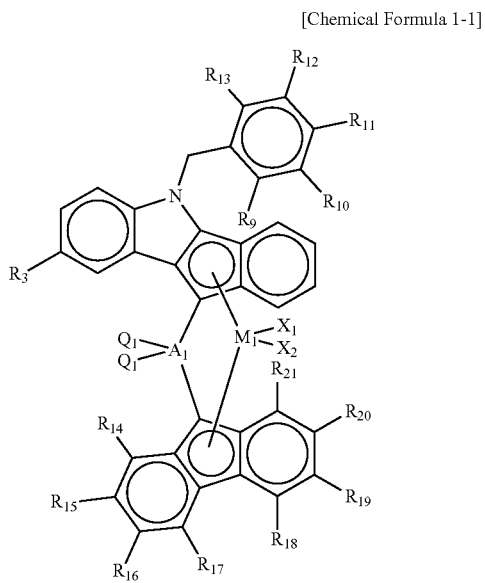

in Chemical Formula 1-1, $Q_1$, $Q_2$, $A_1$, $M_1$, $X_1$, $X_2$, $R_3$, and $R_9$ to $R_{21}$ are the same as defined in claim 7.

9. The method for preparing the polyethylene according to claim 7, wherein each of the $Q_1$ and $Q_2$ is independently $C_{1-3}$ alkyl, or $C_{2-12}$ alkoxyalkyl, each of the $X_1$ and $X_2$ is independently halogen, $A_1$ is silicon, and $M_1$ zirconium or hafnium.

10. The method for preparing the polyethylene according to claim 7, wherein each of the $R_9$ to $R_{13}$ and $R_{9'}$ to $R_{13'}$ is independently hydrogen, or $C_{1-6}$ haloalkyl, provided that at least one of $R_9$ to $R_{13}$ and $R_{9'}$ to $R_{13'}$ is $C_{1-6}$ haloalkyl.

11. The method for preparing the polyethylene according to claim 7, wherein the $R_3$ is $C_{1-6}$ linear or branched alkyl.

12. The method for preparing the polyethylene according to claim 7, wherein each of the $R_{14}$ to $R_{21}$ is independently hydrogen or $C_{1-20}$ alkyl, or two or more of the $R_{14}$ to $R_{21}$ that are adjacent to each other are connected with each other to form a $C_{6-20}$ aliphatic or aromatic ring substituted with $C_{1-3}$ alkyl.

13. The method for preparing the polyethylene according to claim 7, wherein the second metallocene compound is represented by one of the following Chemical Formulae 3-1 and 3-2:

[Chemical Formula 3-1]

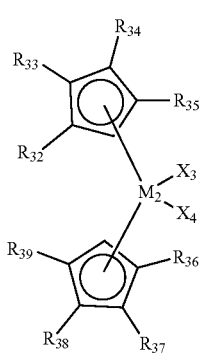

[Chemical Formula 3-2]

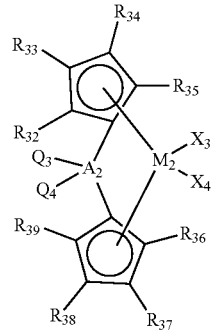

in Chemical Formulae 3-1 to 3-2, $Q_3$, $Q_4$, $A_2$, $M_2$, $X_3$, $X_4$, and $R_{32}$ to $R_{39}$ are the same as defined in claim 7.

14. The method for preparing the polyethylene according to claim 7, wherein each of the $X_3$ and $X_4$ is independently halogen, and $M_2$ is zirconium or hafnium.

15. The method for preparing the polyethylene according to claim 7, wherein each of the $R_{34}$ and $R_{37}$ is independently unsubstituted $C_{1-6}$ alkyl or $C_{2-6}$ alkyl substituted with $C_{1-6}$ alkoxy.

16. The method for preparing the polyethylene according to claim 7, wherein a weight ratio of the first metallocene compound and the second metallocene compound is 45:55 to 60:40.

17. The method for preparing the polyethylene according to claim 7, wherein the polymerization is carried out while introducing 70 ppm to 120 ppm of hydrogen gas based on ethylene content.

18. The method for preparing the polyethylene according to claim 7, wherein the second metallocene compound is represented by one of the following Chemical Formulae 3-3 to 3-2:

[Chemical Formula 3-3]

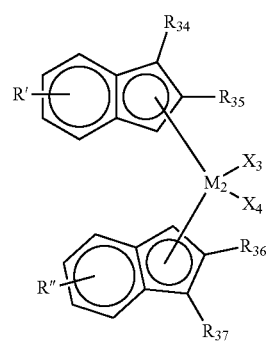

[Chemical Formula 3-4]

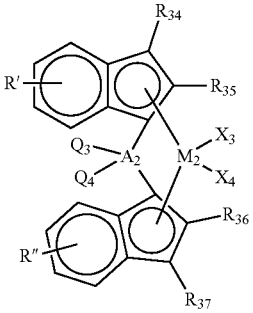

in Chemical Formulae 3-3 to 3-4, $Q_3$, $Q_4$, $A_2$, $M_2$, $X_3$, $X_4$, and $R_{34}$ to $R_{37}$ are the same as defined in claim 7, and R' and R" are the same as or different from each other, and are each independently a $C_{1-10}$ hydrocarbyl group.

19. A chlorinated polyethylene prepared by reacting the polyethylene according to claim 1 with chlorine.

20. The chlorinated polyethylene according to claim 19, wherein the chlorinated polyethylene has a Mooney viscosity (MV) measured at 121° C. of 60 or more to less than 140.

* * * * *